United States Patent [19]

Hinks et al.

[11] Patent Number: 5,678,039

[45] Date of Patent: Oct. 14, 1997

[54] SYSTEM AND METHODS FOR TRANSLATING SOFTWARE INTO LOCALIZED VERSIONS

[75] Inventors: Paul Hinks, Santa Cruz; James Shian Hwa Lok, San Jose, both of Calif.

[73] Assignee: Borland International, Inc., Scotts Valley, Calif.

[21] Appl. No.: 316,690

[22] Filed: Sep. 30, 1994

[51] Int. Cl.⁶ .................... G06F 17/30; G06F 17/28
[52] U.S. Cl. .................... 395/604; 395/603; 395/606; 395/619; 395/333; 395/335; 395/758; 395/795
[58] Field of Search .................... 395/600, 153, 395/603, 604, 606, 619, 333, 335, 758, 795; 364/200, 419.05, 900

[56] References Cited

U.S. PATENT DOCUMENTS

| | | | |
|---|---|---|---|
| 3,611,316 | 10/1971 | Woodrum | 340/172.5 |
| 4,456,969 | 6/1984 | Herzik et al. | 364/900 |
| 4,566,078 | 1/1986 | Crabtree | 364/900 |
| 4,575,798 | 3/1986 | Lindstrom et al. | 364/300 |
| 4,731,735 | 3/1988 | Borgendale et al. | 364/200 |
| 4,809,158 | 2/1989 | McCauley | 364/200 |
| 4,870,402 | 9/1989 | DeLuca et al. | 340/825 |
| 5,072,386 | 12/1991 | Gerneau et al. | 364/419 |
| 5,148,541 | 9/1992 | Lee et al. | 395/600 |
| 5,175,803 | 12/1992 | Yeh | 395/100 |
| 5,181,162 | 1/1993 | Smith et al. | 364/419 |
| 5,243,519 | 9/1993 | Andrews et al. | 364/419.05 |
| 5,274,805 | 12/1993 | Ferguson et al. | 395/600 |
| 5,416,903 | 5/1995 | Malcolm | 395/155 |
| 5,490,061 | 2/1996 | Tulin et al. | 364/419.02 |

OTHER PUBLICATIONS

Petzold, C., *Programming Windows*, Second Edition, 1990, pp. 125–131 (Chapter 3: The Keyboard).

William S. Hall, "Adapt Your Program for Worldwide Use With Windows International Support", Microsoft Systems Journal, Nov./Dec. 1992, pp. 29–58.

*Primary Examiner*—Thomas G. Black
*Assistant Examiner*—C. Lewis
*Attorney, Agent, or Firm*—John A. Smart; Michael J. Ritter

[57] ABSTRACT

A Software Translation Kit (STK) system having a shell, TShell, coupled to an Export/Import module and various Editors is described. The Export/Import module itself includes a parsing engine to extract strings and translatable information from application programs. It functions as a front end parser to "translatable" sources, providing data conversion as needed. The STK system provides a standard interface and set of tools which can be used to localize graphic user interface products. By employing a datacentric approach, the system provides a standard platform which allows translators to act independently of the product they are translating.

43 Claims, 31 Drawing Sheets

FIG. 8A

```
┌─────────────────────────────────────────────────────────────┐
│ ■ 4DOS - DCOMP                                    _ □ ☒    │
│ NOTEPAD.RC vs NOTEPAD.RD    Line 223  vs  Line 223   Same  │
│                                                             │
│ STYLE DS_MODALFRAME | WS_POPUP | WS_VISIBLE | WS_CAPTION | WS_SYSMENU │
│ CAPTION "Seite einrichten"                                  │
│ FONT 8, "Helv"                                              │
│ {                                                           │
│  LTEXT "&Kopfzeile:", -1, 7, 6, 41, 10                      │
│  EDITTEXT 30, 51, 6, 60, 12, ES_AUTOHSCROLL | WS_BORDER | WS_GROUP | WS_TABSTOP │
│  LTEXT "&Fusszeile:", -1, 7, 25, 38, 10                     │
│  EDITTEXT 31, 51, 25, 60, 12, ES_AUTOHSCROLL | WS_BORDER | WS_GROUP | WS_TABSTOP │
│  GROUPBOX "Ränder", -1, 5, 42, 150, 49, BS_GROUPBOX         │
│  LTEXT "&Links:", -1, 11, 56, 25, 10                        │
│                                                             │
│ STYLE DS_MODALFRAME | WS_POPUP | WS_VISIBLE | WS_CAPTION | WS_SYSMENU │
│ CAPTION "Page Setup"                                        │
│ FONT 8, "Helv"                                              │
│ {                                                           │
│  LTEXT "&Header:", -1, 7, 6, 37, 10                         │
│  EDITTEXT 30, 45, 6, 60, 12, ES_AUTOHSCROLL | WS_BORDER | WS_GROUP | WS_TABSTOP │
│  LTEXT "&Footer:", -1, 7, 25, 33, 10                        │
│  EDITTEXT 31, 45, 25, 60, 12, ES_AUTOHSCROLL | WS_BORDER | WS_GROUP | WS_TABSTOP │
│  GROUPBOX "Margins", -1, 5, 42, 150, 49, BS_GROUPBOX        │
│  LTEXT "&Left:", -1, 12, 56, 25, 10                         │
│                                                             │
│ F1 = Help                              F10 = Exit or Restart│
└─────────────────────────────────────────────────────────────┘
```

TRANSLATED (GERMAN) RESOURCE

ORIGINAL (ENGLISH) RESOURCE

FIG. 10E

TRANSLATION TABLE 1100

| FIELD NAME | TYPE |
|---|---|
| FATHER | N |
| TYPE | A1 |
| TRANSLATABLE | A1 |
| IDENTIFIER | A49 |
| DIMENSION | A29 |
| STRING | STRMAXSTRINGLENGTH |
| NUMBER | N |
| NEW_DIMENSION | A29 |
| NEW_STRING | STRMAXSTRINGLENGTH |
| CLASS | A19 |
| STYLE | N |
| USED | A1 |
| FILENAME | A79 |
| COMMENTS | STRMAXSTRINGLENGTH |
| DATE | D |
| ID_VALUE | N |

FIG. 11

SYSTEM AND METHODS FOR TRANSLATING SOFTWARE INTO LOCALIZED VERSIONS

COPYRIGHT NOTICE

A portion of the disclosure of this patent document contains material which is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND OF THE INVENTION

For software publishers, overseas markets comprise an ever-growing percentage of revenues for all major PC applications. Traditionally, however, software products have been designed with little or no thought toward portability, let alone translating software products for overseas markets. As non-English speaking countries are buying more and more software from U.S. publishers, there is keen interest in improving the process of enabling or "internationalization", that is, designing and coding a software product so that it can be made to function for international use.

In the past, the process of providing National Language Support (i.e., accommodating a specific country's language, conventions, and culture) was done on a more or less ad hoc basis—essentially retrofitting software to accommodate a particular locale. Merely separating the text in a user interface from one's program is not an acceptable solution, however. Even after translating software prompts, help messages, and other textual information to the target languages, one still has to address basic issues of displaying and printing characters in the target language.

For instance, a target language will often include characters which are not defined by the default character set provided by the computer's operating system. IBM-compatible PCs running MS-DOS, for example, can display and print up to 256 different characters, the first 128 characters of which include the well-known 7-bit ASCII character set. This, of course, is not enough characters to support all languages. Some languages will obviously require a different character set; thus, sufficient means must be provided for switching character sets.

Other issues to consider when developing a system for foreign users include keyboard layout and various format conventions applicable for a particular country. Any use of currency, date, time, and the like within one's software must take into account these factors. For example, keyboards sold for European languages must include additional characters, such as letters with diacritics, and symbols, such as the British pound (£) sign.

Another potentially serious problem for localizing a program is the set of assumptions with which the underlying source code for the program was written. Assumptions made by English-speaking programmers, which were quite valid for the once-ubiquitous ASCII character set, often break down when dealing with a foreign language. For instance, the common programming technique of converting a character to uppercase by simply adding the number 32 to the character (numeric code) is often inappropriate for non-ASCII characters. Similarly, one cannot rely on standard C functions either. For instance, one cannot use simple string comparison functions like the C programming language's strcmp() function. Does an "ñ" (i.e., an "a" with a diacritic) sort before or after a normal "a"?

One of the first serious attempts at providing National Language Support (NLS) for PCs was Microsoft's MS-DOS version 3.3. Since MS-DOS accommodates different sets of 256 characters for displaying and printing text, a system may employ different characters by swapping in new character sets. Each such character set is referred to as a "code page"; the code page in use at any given time is called the "active code page." When installing operating system software, a user typically selects a code page appropriate for his or her national language.

MS-DOS also includes an API (Application Programming Interface) having a variety of functions related to internationalization. Included are functions for inspecting code pages for determining and controlling how the keyboard, display, and printer handle characters. The API includes functions, for instance, for inspecting and changing the current country code and obtaining information about the conventions associated with a current country code (e.g., how to display dates, currency, and the like).

Newer versions of MS-DOS also include support for character comparisons, through use of language-independent tables for sorting strings. Still, this is by no means a complete solution to the problem. Arabic languages, for instance, remain problematic. For one, Arabic is read and written right-to-left, not left-to-right. Also, Arabic characters require contextual analysis in order to determine which of four different shapes the Arabic characters should have (depending upon location in a word or phrase). Thus, a language may have its own special set of problems which must be addressed before international use.

At the level of application development, software translation is typically accomplished by extracting "translatable strings" from various sources, translating them into the local language, and reinserting them back into the original sources for recompilation and linking. The approach has distinct disadvantages, however. For instance, the process of parsing different types of sources and extracting "translatable items" from those sources is prone to error. Owing to the complexity of modern-day software development, sources are typically very diverse, ranging for example from strings embedded in C/C++ source to well-organized data sets in resource files. The ability of systems to reliably parse these different types of sources and identify each translatable item by a unique token is fairly limited. This limitation substantially affects the success of steps in the process and the reusability of tools from one project to another.

To date, translation tools have focused on character-based information, taking into consideration only literal text strings. However, as more and more software development exploits graphical user interfaces, such as Microsoft Windows, this character-centric approach is inadequate. Other elements of the user interface require appropriate handling. For instance, the use of particular icons and bitmaps in one locale may be entirely inappropriate in another locale. Moreover, a system should take into consideration secondary effects of translation. For instance, translating a prompt in a dialog box from English to German may, in fact, require that the dialog box be resized (e.g., to accommodate a larger text string).

Moreover, the present-day approach to software translation requires substantial human resources. Since tools are not typically reusable, the cost of developing new tools and having translators learn them can be quite substantial. These costs result not only from the resources required for training translators but also result from the delays in bringing a product to market.

SUMMARY OF THE INVENTION

The present invention comprises a Software Translation Kit (STK) system having a shell, TShell, coupled to an Export/Import module and various Editors. The Export/Import module itself includes a parsing engine to extract strings and translatable information from application programs. It functions as a front end parser to "translatable" sources, providing data conversion as needed.

Employing TShell as a front end, an end-user translator employs the various modules of the system as follows. First, the sources are parsed by the Export/Import module to a translatable format. As shown, a resource file for the original program may be obtained (e.g., from the original source files), or may be generated from the original program by decompiling the resources bound to a program into a resource file (e.g., Microsoft Windows .RC format). From there, Export/Import (EXPIMP) module parses the resource file into a Translation Table, which is typically stored as a database table. The Translation Table encapsulates all the information that is known or can be derived from the various resources and stores them in a format which may be utilized by various editors.

Using editors, which may include a string editor, menu editor, dialog editor, and the like, the end user (translator) can easily access and manipulate the various resources of the program for carrying out translation. The translations themselves are stored back in the Translation Table. Once the end-user translator has completed the task of translating the resources, the translated text is merged back to sources. The Export/Import module is again employed, this time for generating a translated resource file. The translated resource file is similar to the original resource file, except that any necessary translations (e.g., translating an English text string into a French text string) have been carried out. In addition to translating text strings, other graphical user interface modifications, such as resizing of resources, have also been carried out.

Once the translated resource file has been generated, the target product is rebuilt with the new sources. The file may be simply stored back with the source files, as a translated resource file(s); or, the translated resource file may be compiled and bound back into the target program directly. In either instance, the underlying program code (i.e., the code which the programmer has written to carry out the functionality of the program) has remained untouched by the process.

The system of the present invention provides translators with a common user interface and translation platform, so that one need not continually learn new tools every time a new product requires translation. Thus, the system of the present invention provides a standard set of translation tools which may be employed for all translation processes. Resources for products to be translated are stored in an external resource file in a standard format. Thus, the translation process need not interfere with the executable binary (i.e., main program) of a product. In this fashion, changing a product from one locale to another can be reduced to the simple process of swapping out resource files.

BRIEF DESCRIPTION OF THE DRAWINGS

FIG. 8A is a bitmap screenshot illustrating a string editor of the present invention.

FIGS. 10A–F are bitmap screenshots illustrating the process of translating a particular resource, Windows Notepad "Page Setup " dialog.

FIG. 11 is a block diagram illustrating layout of the translation table of the present invention.

GLOSSARY

ASCII: American Standard Code for Information Interchange; a sequence of 128 standard characters.

Code page: A character set, such as available in MS-DOS versions 3.3 and later, that provides a table for relating the binary character codes used by a program to keys on a keyboard or to the appearance of characters on a display.

Database: An organized collection of information.

Database Management System (DBMS): System that controls the organization, storage, and retrieval of information in a database.

Enabling or Internationalization: Designing and coding a product so that it can be made to function for international use. A product is enabled if a national language version can be created at minimal expense and if it does not interfere with current or planned national language support of other products.

File: A collection of information stored under one name on a disk. For example, the system tables are stored in files.

Index: A file that determines an order in which the system can access the records in a table.

Glyph: A graphic representation of a single character.

Localization: Translating and adding functions to an enabled product to accommodate a country's languages, conventions, and cultures.

National Language: A language or dialect spoken by any group of people.

National Language Support: The features of a product that accommodate a specific country, national language, local convention, culture, and the like.

National Language Version: A variant of an original product that implements National Language Support and is targeted to a particular market.

Retrofitting: Redesign and modification of a product that has not been enabled.

Table: A structure made up(fields) that contains columns (fields) that contains information.

DETAILED DESCRIPTION OF A PREFERRED EMBODIMENT

The following description will focus on the presently preferred embodiment of the present invention, which is operative in the Microsoft® Windows environment operating on Intel-compatible computer system. The present invention, however, is not limited to any particular one application or any particular windows environment. Instead, those skilled in the art will find that the system and methods of the present invention may be advantageously applied to a variety of system and application software, including database management systems, wordprocessors, spreadsheets, and the like. Moreover, the present invention may be embodied on a variety of different platforms, including Macintosh, UNIX, NextStep, and the like. Therefore, the description of the exemplary embodiments which follows is for purposes of illustration and not limitation.

General Architecture

Figure 1:
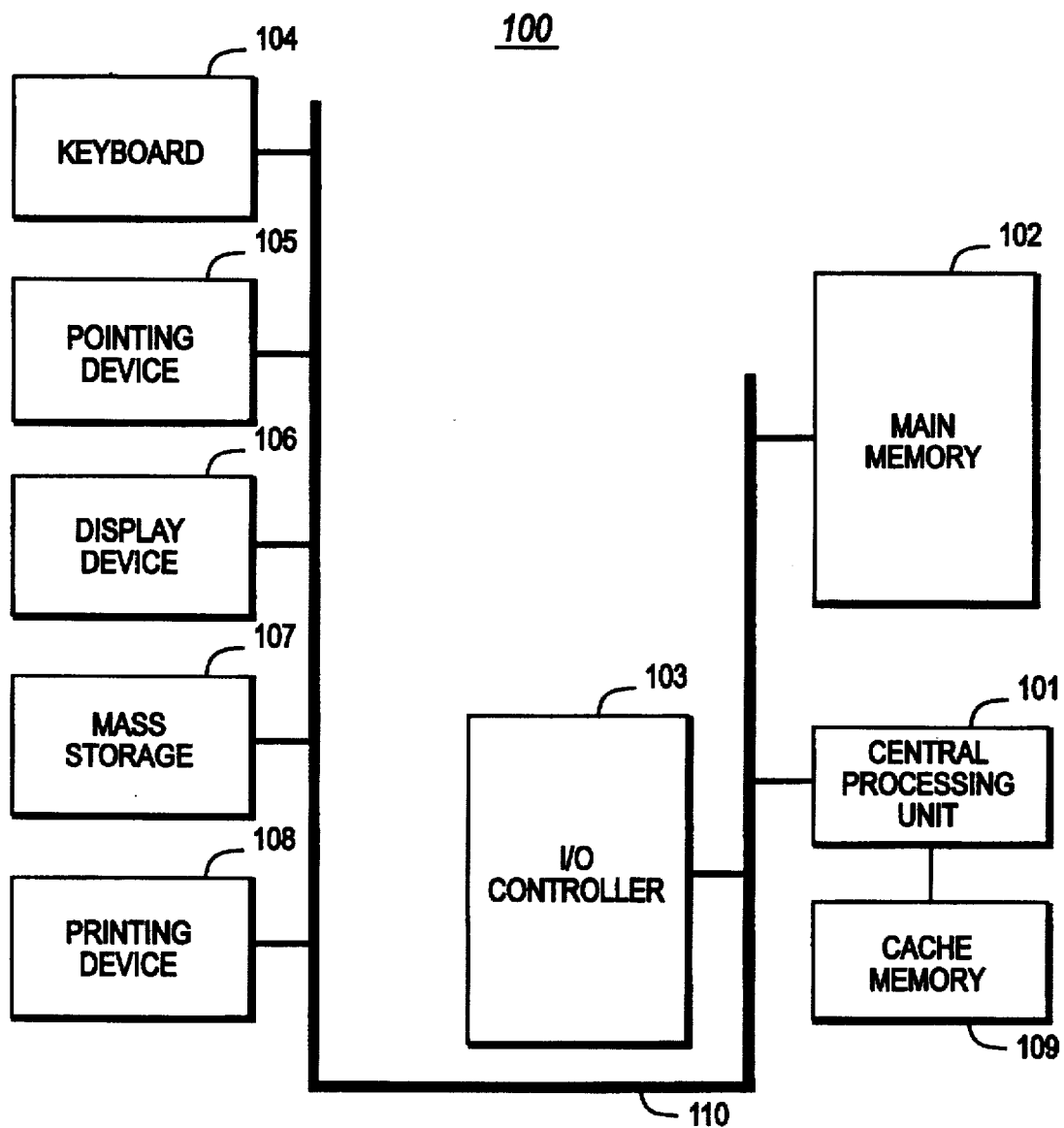
FIG. 1 is a block diagram of a computer system in which the present invention may be embodied.

The present invention may be embodied on a computer system such as the system 100 of FIG. 1, which includes a central processor 101, a main memory 102 (e.g., random-access memory or RAM), an input/output controller 103, a keyboard 104, a pointing device 105 (e.g., mouse, track ball, pen device, or the like), a display device 106, and a non-volatile or mass storage 107 (e.g., hard or fixed disk, optical disk, magneto-optical disk, or flash memory). Processor 101 includes or is coupled to a cache memory 109 for storing frequently accessed information; memory 109 may be an on-chip cache or external cache (as shown). System 100 may also be provided with additional input/output devices, such as a printing device 108, as desired. The various components of the system 100 communicate through a system bus 110 or similar architecture, as shown.

Figure 2:
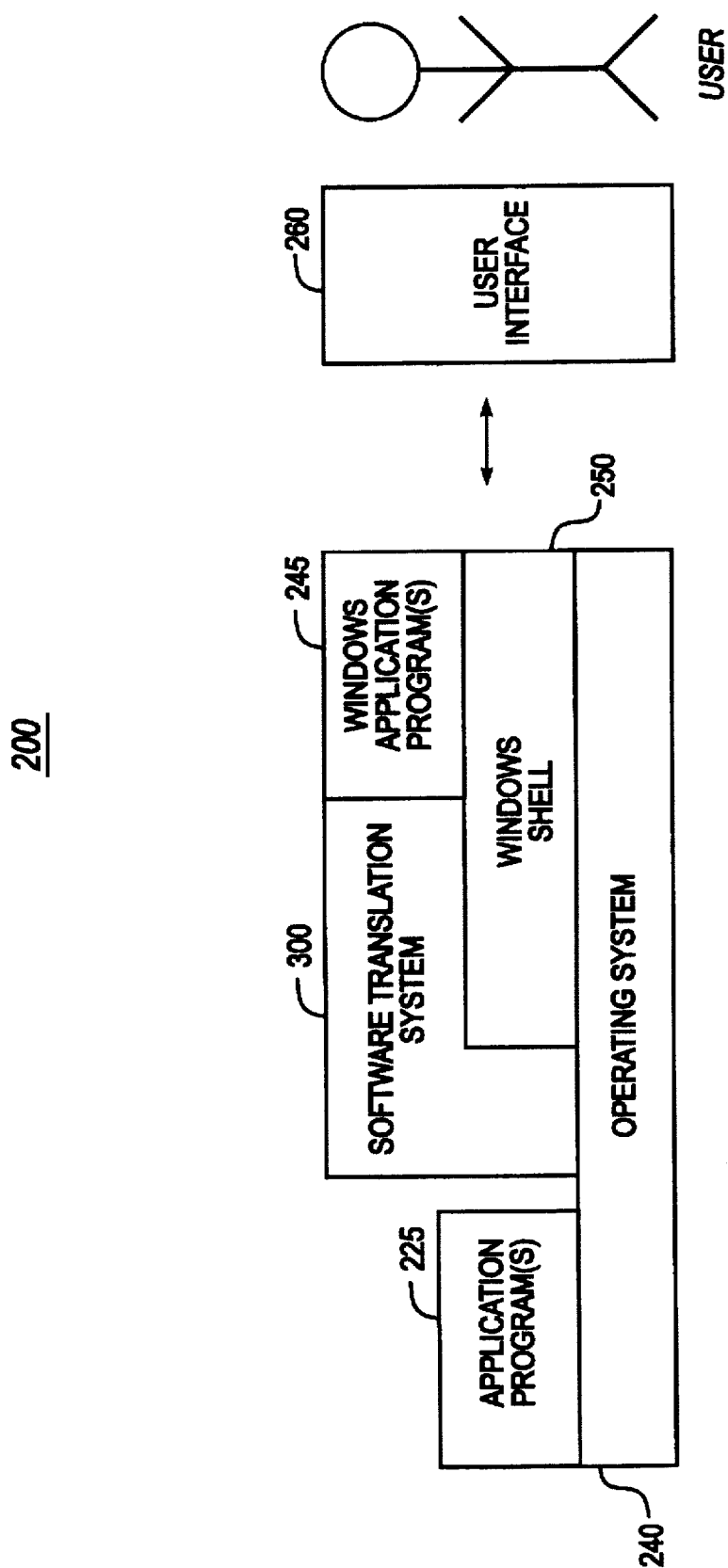
FIG. 2 is a block diagram of a software system of the present invention, which includes operating system, application software, and user interface components.

Illustrated in FIG. 2, a computer software system 200 is provided for directing the operation of the computer system 100. Software system 200, which is stored in system memory 102 and on disk memory 107, includes a kernel or operating system (OS) 240 and a windows shell 250. One or more application programs, such as application software 225 or windows application software 245, may be "loaded" (i.e., transferred from storage 107 into memory 102) for execution by the system 100.

System 200 includes a user interface (UI) 260, preferably a graphical user interface (GUI), for receiving user commands and data. These inputs, in turn, may be acted upon by the system 100 in accordance with instructions from operating module 240, Windows 250, and/or application modules 225, 245. The UI 260 also serves to display the results of an operation, whereupon the user may supply additional inputs or terminate the session. Although shown conceptually as a separate module, the UI is typically provided by Windows shell 250, operating under OS 240. In a preferred embodiment, OS 240 is MS-DOS and Windows 250 is Microsoft® Windows; both are available from Microsoft Corporation of Redmond, Wash.

System 200 also includes a Software Translation Kit (STK) system 300 of the present invention for aiding the translation of software programs to other target languages. As shown, the STK system 300 interfaces with the system 100 through Windows shell 250, as well as interfacing directly through OS 240. The construction and operation of the STK system 300 itself will now be described in detail.

Software Translation

A. Introduction

Consistency and upgradability are fundamental to a successful localization project. As a translated product is upgraded (to a new version), applications created using previous versions of the product should also work with the upgrade. This requirement is becoming increasingly important as vendors strive to release localized versions simultaneously with their main (e.g., English) version. In such an instance, changes occur with practically every new "build" of the product, with each product typically requiring hundreds of builds before commercial release.

In prior art systems, limitations exist on the ability of such systems to store resources in an external resource file. For instance, various parts of a product might be developed or acquired from third parties. Moreover, a particular piece of the product might not lend itself to storage in an external resource file. Examples include, for instance, application macro languages and binary objects created by the product. Another example includes a program sample where proper resourcing might render the sample too complex (and defeats the purpose of providing a simple sample). As will be described below, the present invention includes novel methods for extracting resource information into a platform-independent Translation Table.

So that translation work can be done by individuals with a broad range of technical skills, the system of the present invention focuses on ease of use and standardization; translators who are not programmers (i.e., might not understand how to trace through C++ source listings) can nevertheless still use the system. The system applies a standardized approach so that training can be minimized between projects; the same translators can be employed in different projects with minimum downtime. The approach also allows one to minimize the time needed to recreate new tools for every new project. At the same time, the system is powerful enough to provide translators with the ability to manipulate translation data, provide contextual information, and provide an interactive interface (i.e., emulating the build of the product and checking whether the final product is functional). Finally, the system is flexible enough to address the requirements for handling different types of resource files.

The STK system 300 provides end-user translators with a common user interface and standard translation platform, and localized graphic user interface products (e.g., ones operating under Microsoft Windows and IBM OS/2). Resources for products to be translated are stored in an external resource file in a standard format. The standard platform allows translators to act independently of the product they are translating. By providing generic tools and building blocks, the system affords quick translation of software and eliminates redundancy in development. The enduser translation need not continually learn new tools every time a new product requires translation.

B. Datacentric approach

Present day translation systems generally construct a database which stores only a token that uniquely identifies a string to be translated, the characters which comprise the string, and a translation string. In many cases, however, translation is performed directly over "source" files, that is without using a database at all.

In the system of the present invention, the approach adopted for translating software is "datacentric." During the translation process the focus is on the data: what data need to be extracted from resource files, translated into the local language, and reinserted into the sources (to be used to build the final localized product). Tools are written based on a central data structure—a Translation Table—which is generated by a parsing engine of the system.

In the system of the present invention, the Translation Table contains all the information needed to build editors which can simulate the target UI (User Interface) without having access to the sources or actual binary of the product to be translated. Having the data with this level of detail enables the system of the present invention to extract data from the source files and perform upgrades at a high level. Moreover, by storing the information in database format, the approach benefits from database features, such as a fourth-generation database manipulation language for manipulating the data (e.g., sorting, performing queries, and the like) and creating database forms and reports.

During system operation, all translatable strings are parsed out of original source format. User interfaces to be used as a translation interface are based on, or generated from, information contained in the central data structure. In this manner, data manipulation and upgrade can be performed either between tables or at the parsing extraction level.

Using a "datacentric" process, the translation system of the present invention implements a standard data (container) format, generic extraction tools, and generic editors. The standard format is defined for extracting and storing translation data; the format also specifies how editors will access the data. To ensure that translation work done for one version of a product can be carried forward to future versions automatically, every translatable item is uniquely identified by assigning it an ID which remains static throughout the life of the product. In other words, every translatable item extracted to the data structure is uniquely identified.

C. System Modules

Figure 3:
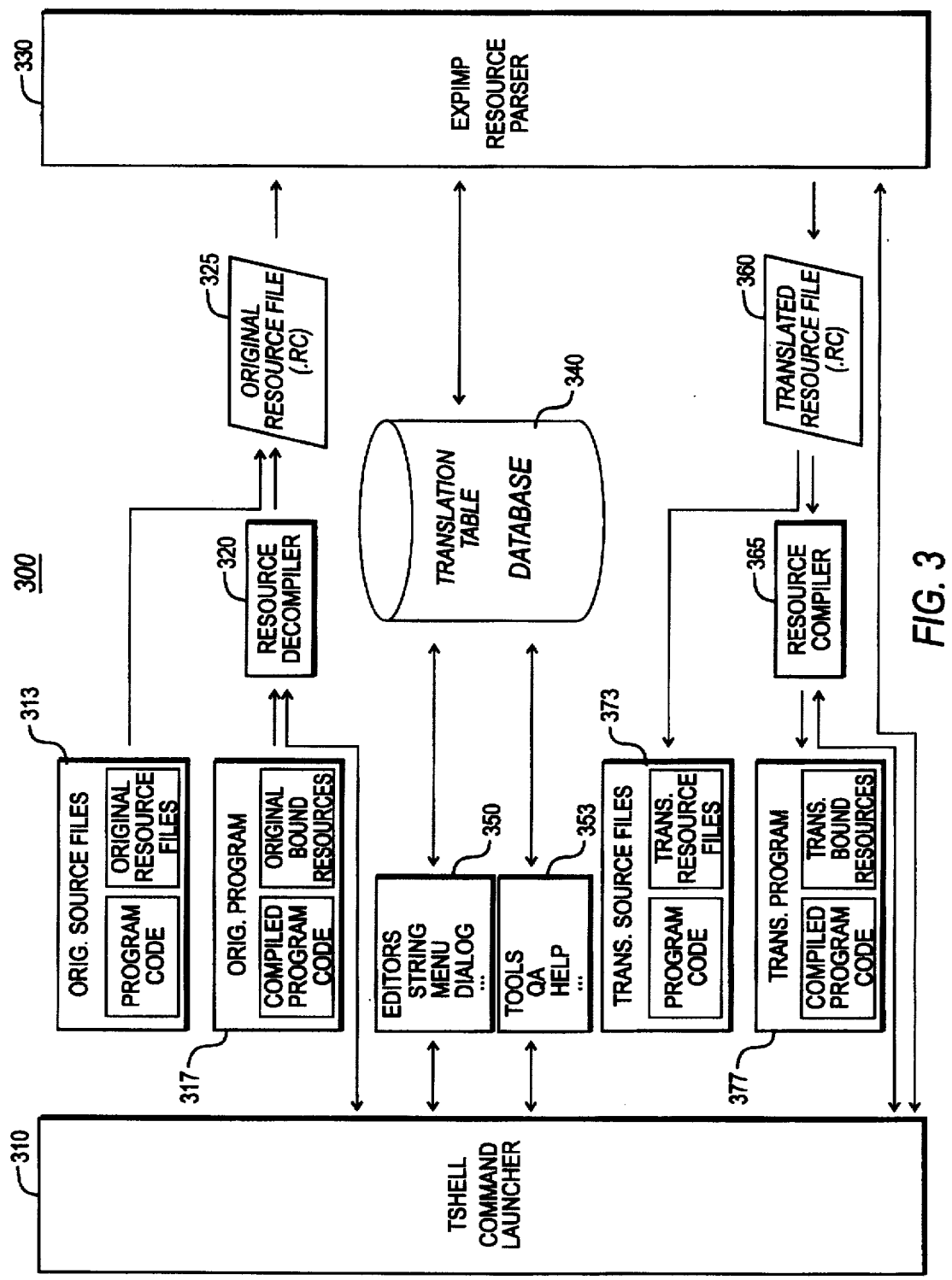
FIG. 3 is a block diagram of a Software Translation Kit (STK) system of the present invention.

FIG. 3 illustrates the functional modules of the STK system 300. Generally under control of TSHELL 310, a common front end and user interface to the translators, the various modules operate as follows. First, the sources are parsed to a translatable format. As shown, a resource file 325 for the original program may be obtained (e.g., from the original source files 313). Alternatively, the resource file may be generated from the original program 317 by using a commerical Resource Decompiler 320, such as Borland's Resource Workshop®, which decompiles resources bound to a program into a resource file 325 (e.g., Microsoft Windows .RC format). From there, EXPIMP (Export/ Import) Resource Parser 330 parses the resource file 325 into a Translation Table 340, which is typically stored as a database table. The Translation Table 340, which is described in further detail hereinbelow, encapsulates all the information that is known or can be derived from the various resources and stores them in a format which may be utilized by various editors.

Using editors 350, which may include a string editor, menu editor, dialog editor, and the like, the end user (translator) can easily access and manipulate the various resources of the program for carrying out translation. The translations themselves are stored back in the translation table 340. As also shown, tools 353, such as quality assurance (QA) and help editing tools, may be employed (e.g., in batch mode), as desired.

Once the end-user translator has completed the task of translating the resources, the translated text is merged back to sources. The EXPIMP module 330 is again employed, this time for generating a Translated Resource File 360. The Translated Resource File 360 is similar to the Original Resource File 325, except that any necessary translations (e.g., translating an English text string into a French text string) have been carried out. Moreover, other graphical user interface modifications, such as resizing of resources, have also been carried out.

Once the translated resource file 360 has been generated, the target product is rebuilt with the new sources. Just as there are two ways to retrieve the original resources from a program, there are two ways to store translated resources back into the program. First, the file may be simply stored back with the source files, shown as Translated Source Files 373. Alternatively, a Resource Compiler 365, again such as Borland's Resource Workshop®, may be employed to re-compile the Translated Resource Files 360 and bind those compiled resources back into the target program, now shown as Translated Program 377. In either instance, the underlying program code (i.e., the code which the programmer has written to carry out the functionality of the program) has remained untouched by the process.

D. Translatable resources

Before describing the Software Translation system of the present invention in further detail, it is helpful to review runtime construction of program resources, such as dialog boxes, in Microsoft Windows.

Figure 4A:
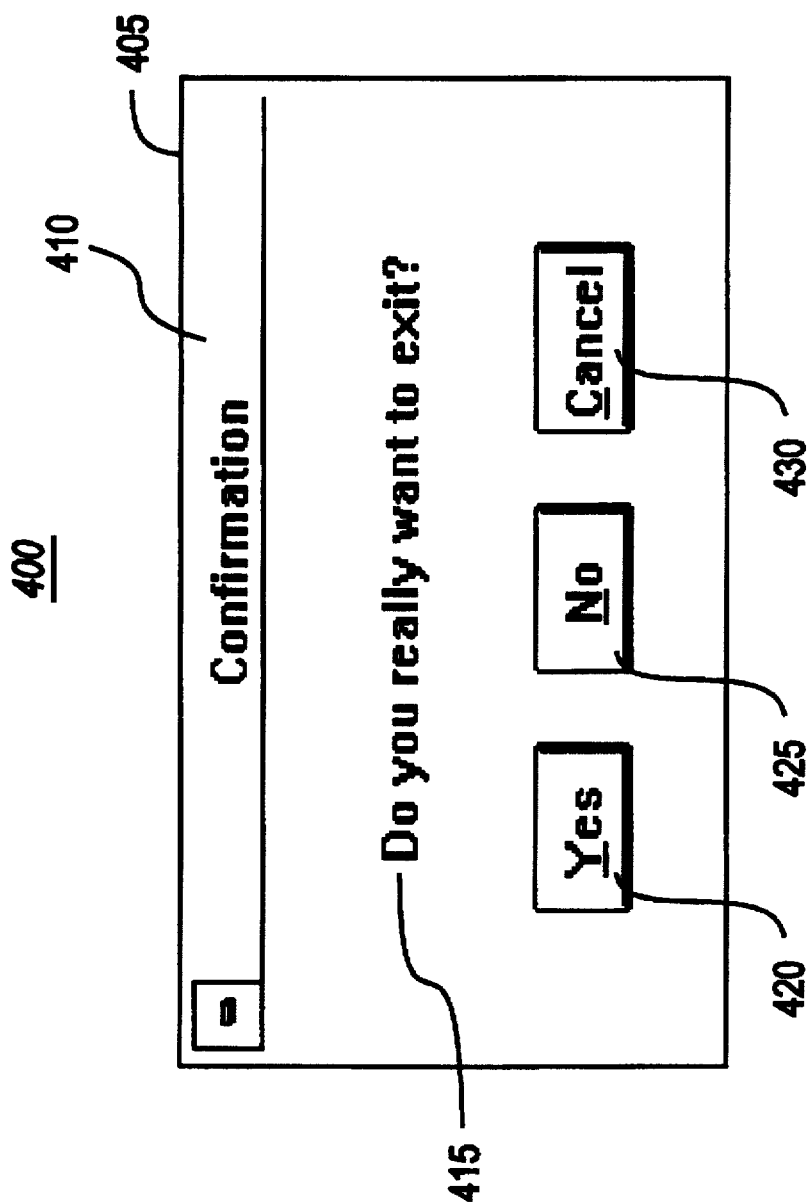
FIG. 4A is a bitmap screenshot illustrating a screen dialog box, which includes children components (e.g., screen buttons).

Consider a typical dialog, such as confirmation message box dialog 400 shown in FIG. 4A. The dialog 400 comprises a screen window 405 which includes a plurality of elements, including caption bar 410, static text 415, and buttons 420, 425, 430. Each of these "children" may, in turn, include still further elements. Button 420, for instance, includes a caption text or label: "Yes".

Figure 4B:
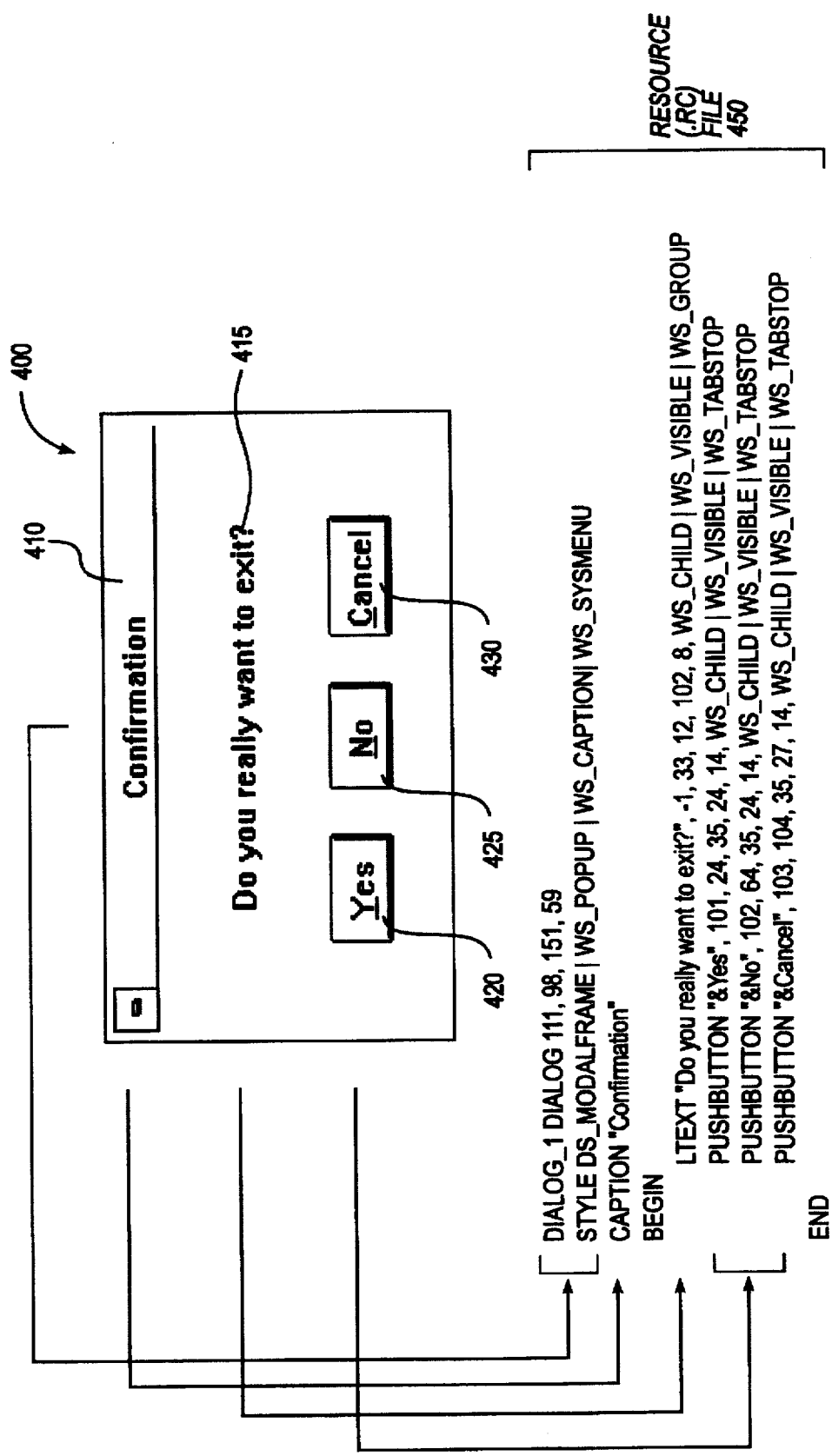
FIG. 4B illustrates the relationship between the dialog of FIG. 4A and underlying resource information (which orginally had been provided by the programmer creating the application).

FIG. 4B shows the resource or programming statements attendant to the creation of each element of dialog 400 (e.g., in Microsoft Windows). The first line of resource file 450, for instance, defines a DIALOG screen element, named DIALOG_1 (identifier), and includes screen coordinates (111, 98, 151, 59) specifying a starting location and size (ending location). The second line specifies various window attributes or "window styles" that the dialog 400 is to assume. Dialog 400, for instance, is to be a "popup" window (Microsoft window style =WS_POPUP) with a caption bar (Microsoft window style=WS_CAPTION) and a system menu (Microsoft window style=WS_SYSMENU). A caption statement (CAPTION "Confirmation") specifies that the text "Confirmation" is to be displayed in the caption bar 410.

Also shown in the resource script are the children screen elements of the dialog 400. Specifically, the static text 415 is defined by the LTEXT statement, while buttons 420, 425, 430 are defined by PUSHBUTTON statements. The definitional statement for each of these includes information similar to that of the parent dialog window—namely, a caption or label, an identifier (resource identifier), a starting location and size, and window styles. Button 410, for instance, is defined by a resource statement having a caption of "&Yes" (& tells Windows to underline the immediately following character), an identifier of 101, screen coordinates of 24, 35, 24, 14, and window style of WS_CHILD (child window), WS_VISIBLE (visible), and WS_TABSTOP (tab stop for setting input focus to this element with tab key).

The foregoing relationship between resource (.RC) script files and screen objects is well known in the field of Windows programming. For those readers unfamiliar with these concepts (i.e., non-Windows programmers), it is strongly suggested that the following references be consulted: Petzold, C., Programming Windows (particularly, Section III: Using Resources); Borland C++: Resource Workshop; and Microsoft Windows Software Development Kit/Microsoft Visual C++.

Figure 4C:
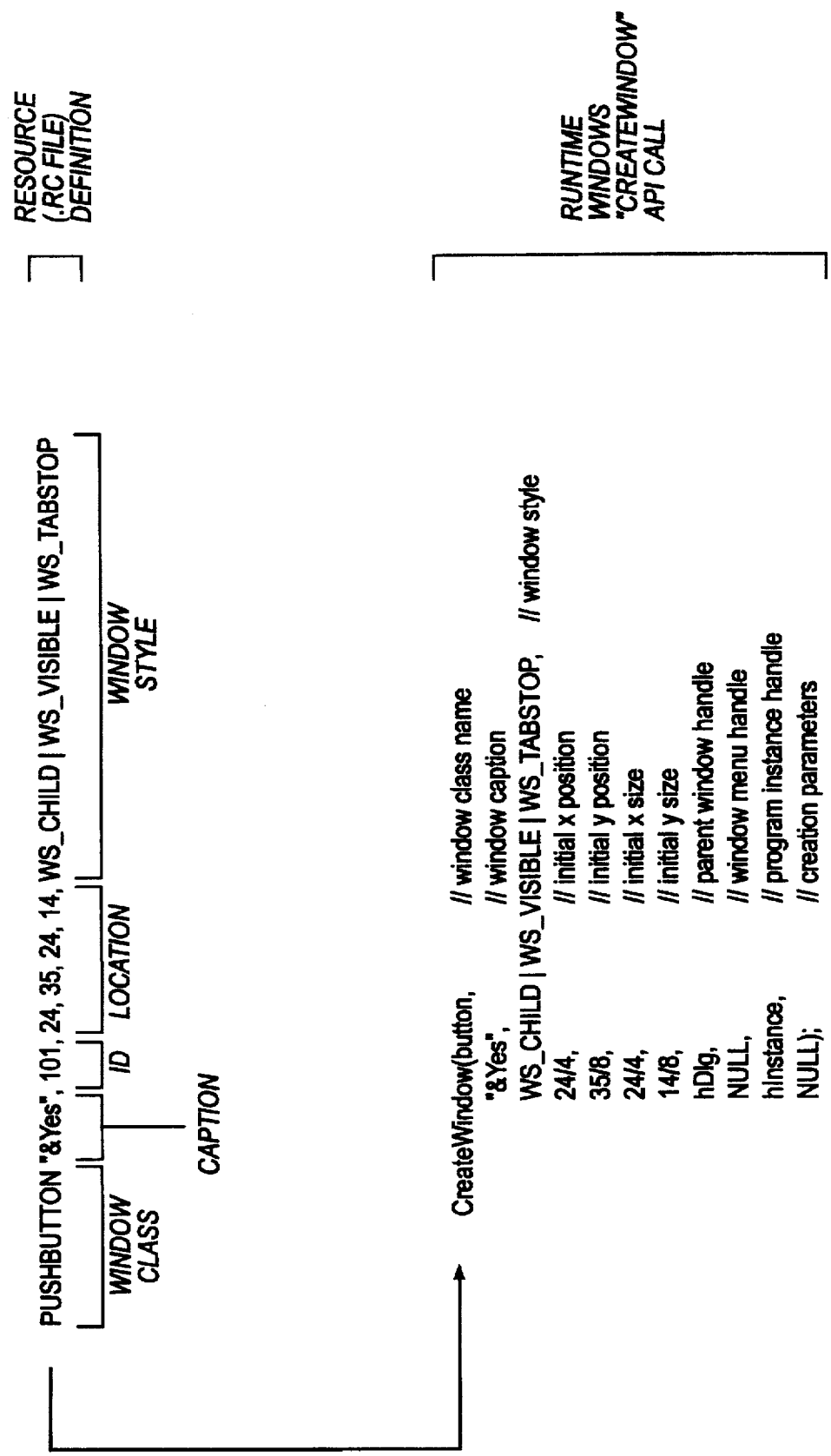
FIG. 4C a diagram illustrating the relationship between source information (e.g., represented in Microsoft Windows resource format) and runtime API (Application Programming Interface) Windows call, CreateWindow.

FIG. 4C illustrates that resource statements in a resource file are at runtime actually implemented as Windows API calls. In particular, a given resource is created at runtime by calling Windows'CreateWindow function, with the aforementioned attributes passed to Windows as parameters. CreateWindow is a standard Windows API call (and is therefore fully documented in the Petzold and Microsoft materials, as well as numerous other references). The "Yes" button 420, for instance, is created by the following CreateWindow call:

```
CreateWindow ( button,          // window class name
               "&Yes",           // window caption
               WS_CHILD |
               WS_VISIBLE |
               WS_TABSTOP,       // window style
               24/cxChar*4,      // initial x position
               35/cyChar*8,      // initial y position
               24/cxChar*4,      // initial x size
               14/cyChar*8,      // initial y size
               hDlg,             // parent window handle
               NULL,             // window menu handle
               hInstance,        // program instance handle
               NULL              // creation parameters
             );
```

At runtime, each CreateWindow call API may be trapped for determining each screen object which is about to be created.

System Operation

A. Windows "Notepad" example

The methods of the present invention for translating an application will now be illustrated using a well-known application—Microsoft Windows Notepad. In particular, a dialog from Microsoft Windows Notepad program will be translated using the tools of the system. In this manner, the reader may focus on the teachings of the present invention without distraction from a complex application.

Figure 5A:
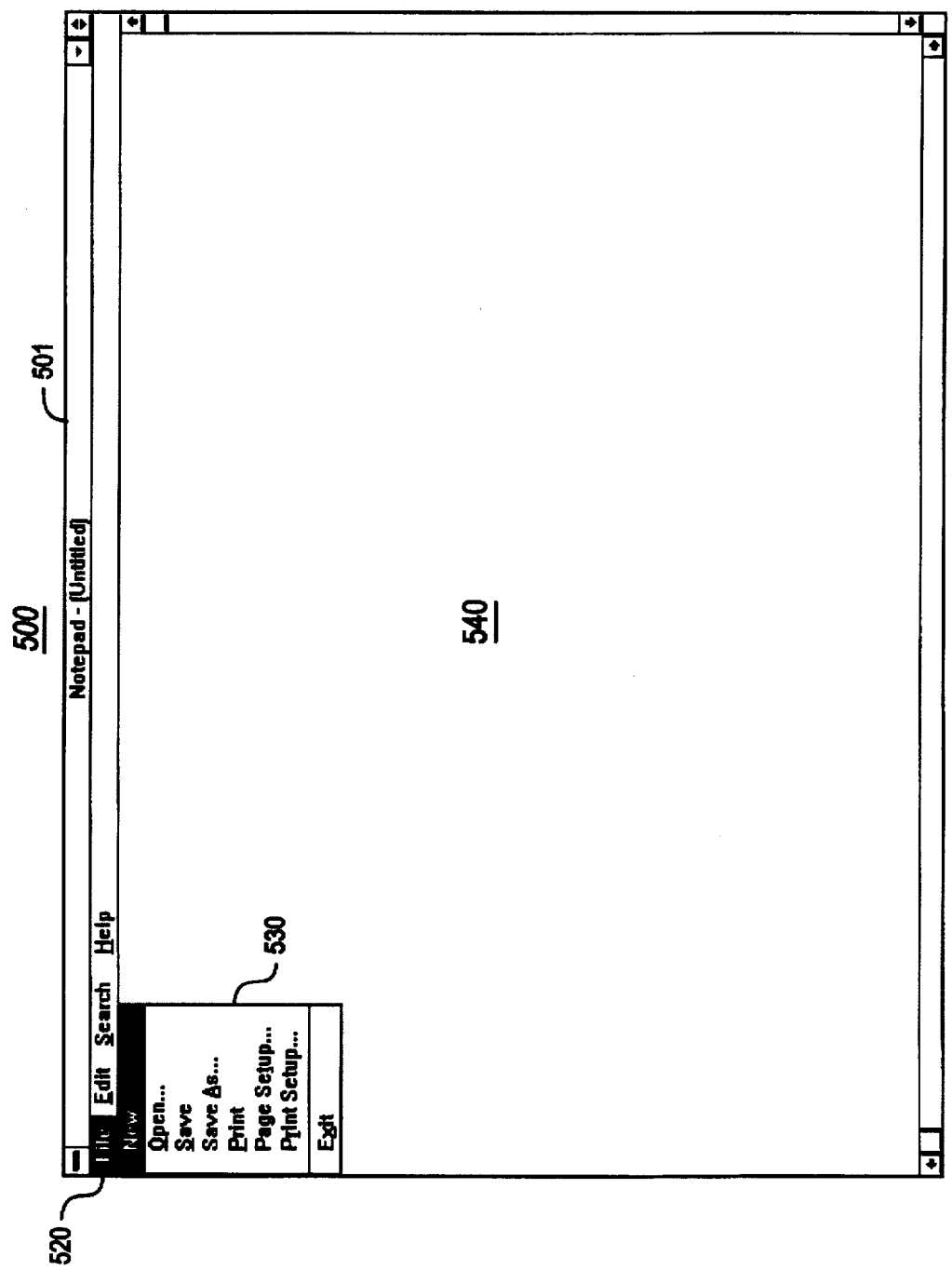
FIG. 5A is a bitmap screenshot illustrating Windows Notepad—a simple Windows application for illustrating operation of the STK system of the present invention.
Figure 5B:
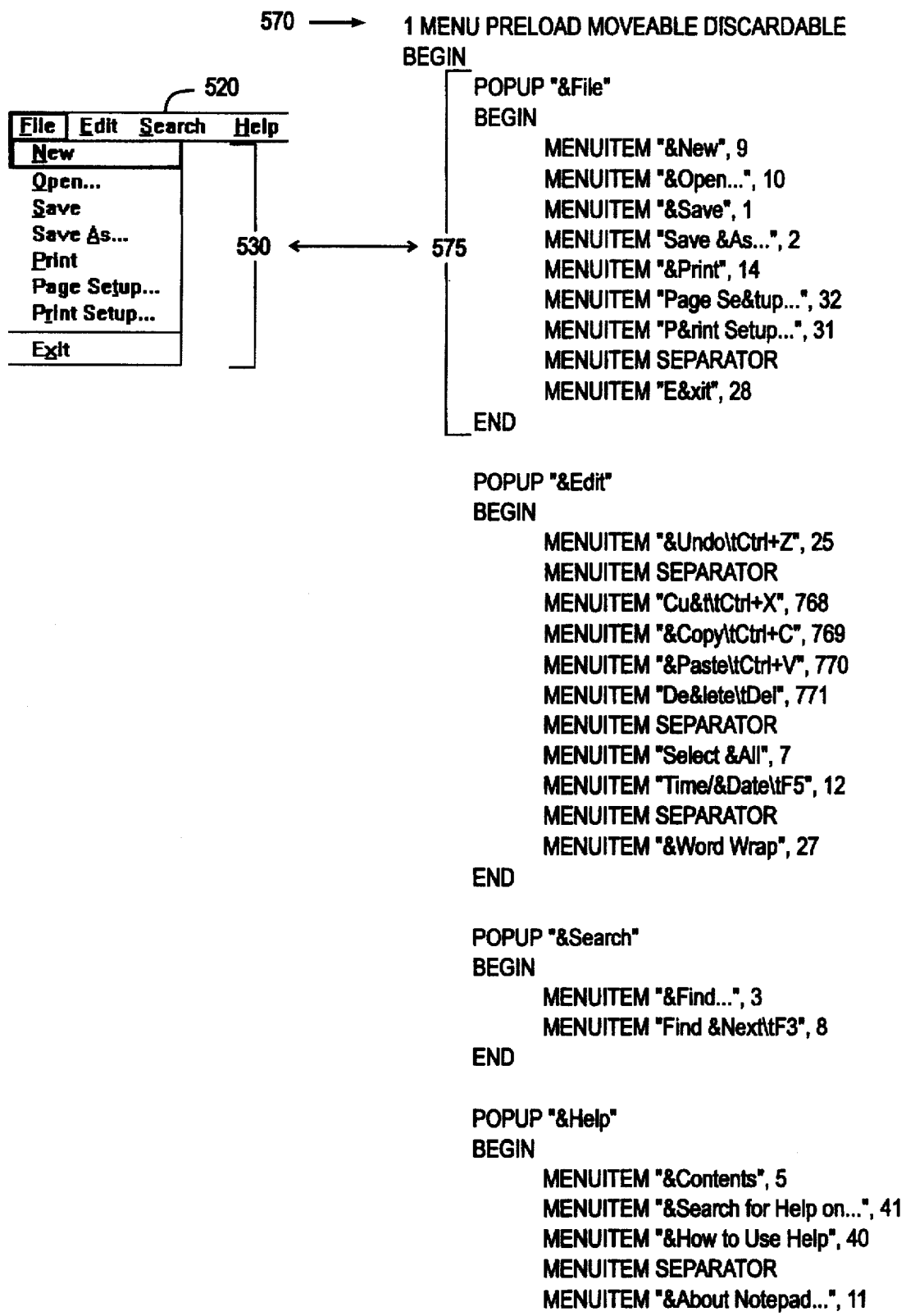
FIG. 5B is a diagram illustrating resource information for a screen menu of the application of FIG. 5A.

The resource composition of Notepad is as follows. The interface for the Notepad application is shown in FIG. 5A. The interface includes a main or application window 500 having a caption bar 501, a menu bar 520, and a client area 540. Menu bar 520, in turn, invokes a plurality of submenus, such as submenu 530. As shown in FIG. 5B, the menu bar 520 and its submenus may be decomposed into a resource file 570. Menu resource file 570 includes "popup" sections defining the submenus which are attached to the menu bar 520. Submenu 530, for instance, is defined by popup section 575. Thus as shown, the menu bar 520 and its submenus may be decomposed for tracking its individual elements. The decomposition into a resource file may be accomplished either by reading resource data from the EXE file (static method), or by executing the EXE file and inquiring about menu information (from the running application during runtime). Using the latter method provides an added advantage since it can extract dynamic menu attributes (grayed, checked, and the like) from the application. These attributes are generally not available in the resource file.

Figure 5C:
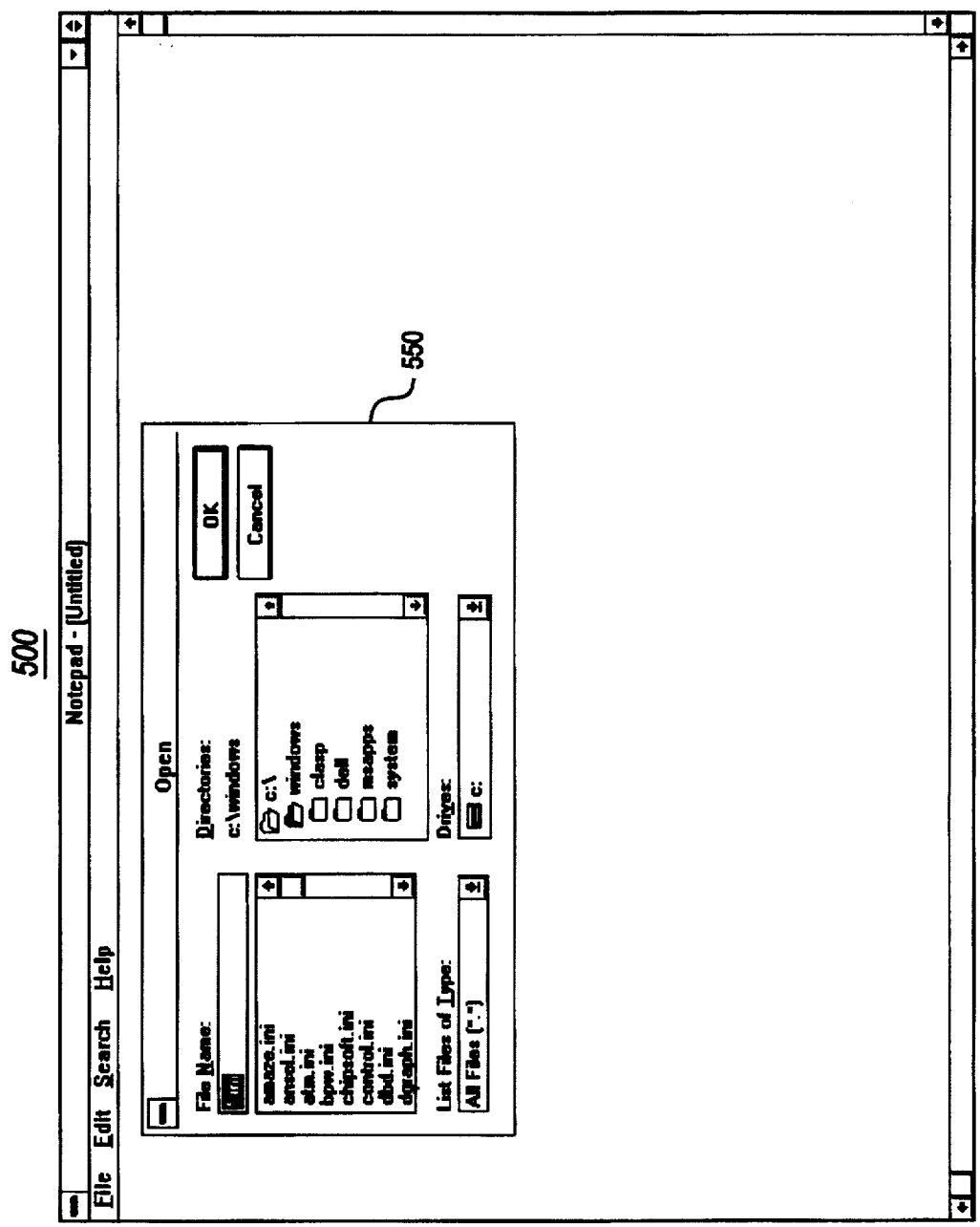
FIG. 5C is a bitmap screenshot illustrating the File|Open command of Notepad.

When the user invokes a File|Open command (e.g., by selecting "Open" from the submenu 530), the Notepad application 500 displays the Open dialog 550, shown in FIG. 5C. The dialog 550 includes a plurality of screen objects. The dialog 550 includes a window with caption bar and includes static text fields, an edit text field, list boxes, combo boxes, and push buttons. Such a dialog is defined by the following resource information:

```
1536 DIALOG LOADONCALL MOVEABLE DISCARDABLE 36, 24, 264, 134
STYLE DS_MODALFRAME | WS_POPUP | WS_CAPTION | WS_SYSMENU
CAPTION "Open"
FONT 8, "Helv"
{
  LTEXT "File &Name:", 1090, 6, 6, 76, 9
  EDITTEXT 1152, 6, 16, 90, 12, ES_AUTOHSCROLL | ES_OEMCONVERT |
    WS_BORDER | WS_TABSTOP
  LISTBOX 1120, 6, 32, 90, 68, LBS_STANDARD | NOT LBS_NOTIFY |
    LBS_OWNERDRAWFIXED |LBS_HASSTRINGS | LBS_DISABLENOSCROLL |
    NOT WS_BORDER | WS_TABSTOP
  LTEXT "&Directories:", -1, 110, 6, 92, 9
  LTEXT "", 1088, 110, 18, 92, 9, SS_NOPREFIX | WS_GROUP
  LISTBOX 1121, 110, 32, 92, 6B, LBS_STANDARD | NOT LBS_NOTIFY |
    LBS_OWNERDRAWFIXED | LBS_HASSTRINGS | LBS_DISABLENOSCROLL |
    NOT WS_BORDER | WS_TABSTOP
  LTEXT "List Files of &Type:", 1089, 6, 104, 90, 9
  COMBOBOX 1136, 6, 114, 90, 36, CBS_DROPDOWNLIST | CBS_AUTOHSCROLL |
    WS_BORDER | WS_VSCROLL | WS_TABSTOP
  LTEXT "Dri&ves:", 1091, 110, 104, 92, 9
  COMBOBOX 1137, 110, 114, 92, 63, CBS_DROPDOWNLIST |
    CBS_OWNERDRAWFIXED | CBS_AUTOHSCROLL | CBS_SORT |
    CBS_HASSTRINGS | WS_BORDER | WS_VSCROLL | WS_TABSTOP
  DEFPUSHBUTTON "OK", 1, 208, 6, 50, 14, BS_DEFPUSHBUTTON |
```

-continued

```
    WS_GROUP | WS_TABSTOP
 PUSHBUTTON "Cancel", 2, 208, 24, 50, 14, WS_GROUP | WS_TABSTOP
 PUSHBUTTON "&Help", 1038, 208, 46, 50, 14, WS_GROUP | WS_TABSTOP
 CRECKBOX "&Read Only", 1040, 208, 68, 50, 12, BS_AUTOCHECKBOX |
    WS_GROUP | WS_TABSTOP
}
```

B. User operation

1. Configuration

Figure 6A:
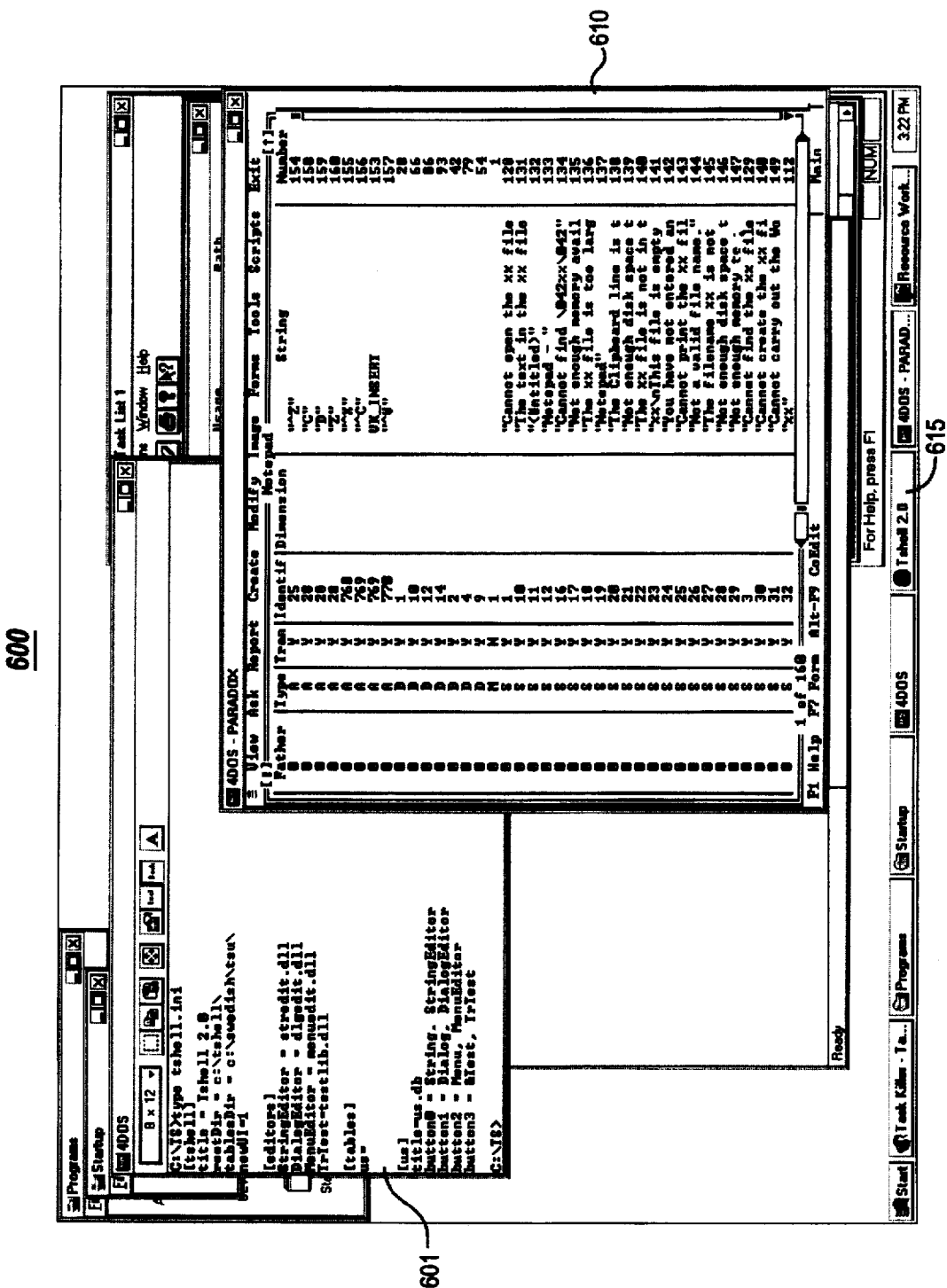
FIG. 6A is a bitmap screenshot illustrating a Graphical User Interface (GUI) or workspace for the software translation system of the present invention.

As shown in FIG. 6A, the software translation system is generally operated by the user through a graphical user interface, such as workspace 600, shown in the figure. As shown at 601, the TShell module is configurable by the user via a TSHELL.INI config file. For instance, the configuration file includes an "Editors" section for specifying the various editors which TShell may launch. Similarly, the configuration file includes a "Tables" section for specifying the source language (e.g., U.S. English).

2. Underlying data structure

Also shown in FIG. 6A is Translation Table 610, which stores information parsed from the resources of the program to be translated (in this instance, Windows Notepad). Shown in greater detail in FIG. 6B, the Translation Table 610 includes fields for storing for each resource its Resource Identifier, String value, Dimension, and Type.

Figure 6B:
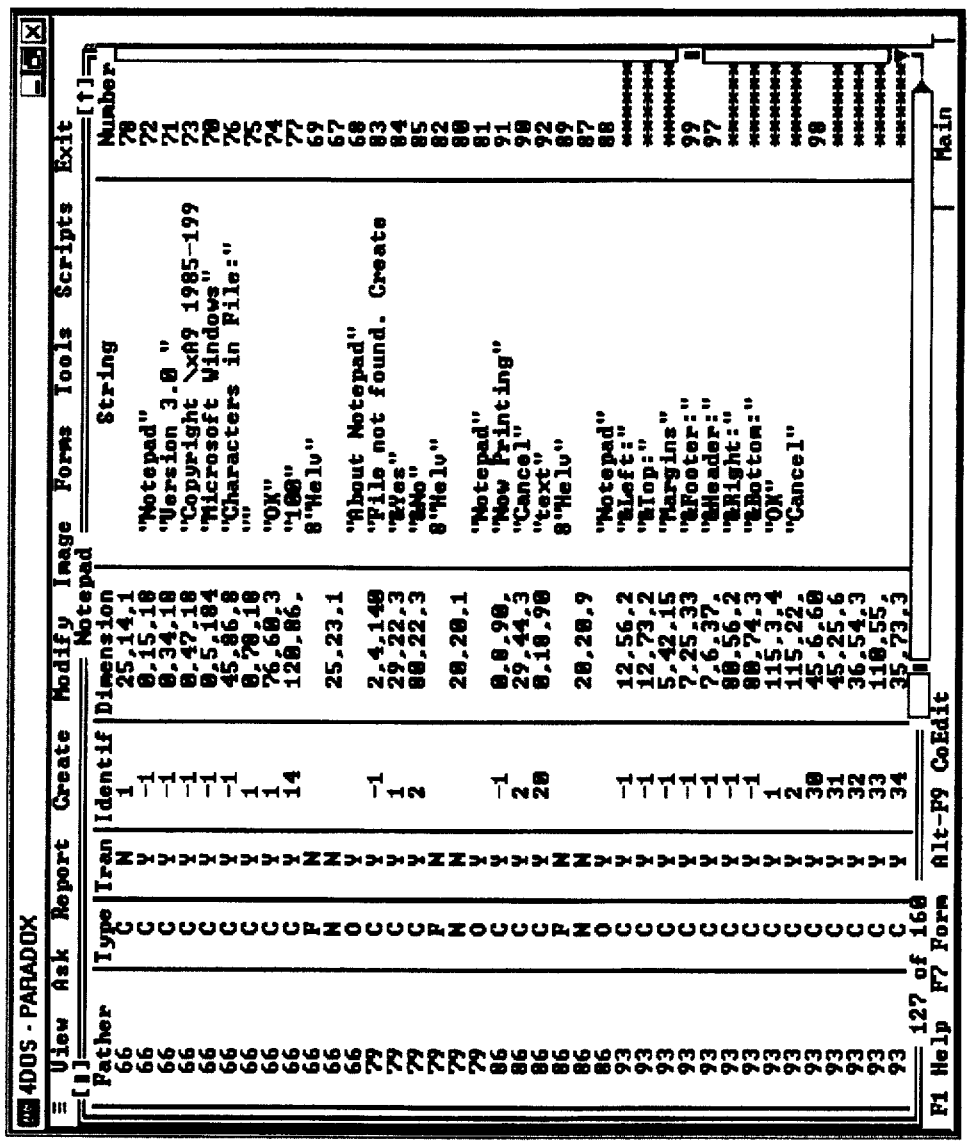
FIG. 6B illustrates a translation table of the present invention, which serves as a data container for storing translatable information.

For each resource the table stores information about the owner or "Father" of the resource. A dialog, being a top-level resource, has a father of zero (i.e., no father). The dialog, in turn, is a father for the resources it contains. Thus, these resources store in their "Father" fields a handle or ID referring back to the dialog. In FIG. 6B, for instance, the static text resources for the "about box" of Notepad are shown at 620. The father for these resources is the "About" dialog itself which, as shown in the table, has an identifier of 66.

Also shown, the Translation Table 610 includes a Translated field which indicates whether a particular resource is a translatable item. Unlike prior art systems, the software translation system of the present invention treats the dimension of each resource as a translatable item and carries that information forward. As will be illustrated below, this allows the end user to adjust dimensions on the fly, during translation.

3. TShell

At this point, the system is properly configured and now ready to begin translating the target program, Windows Notepad. The user initiates the translation session by loading TShell (e.g., by selecting it from screen button 615, or by running it from the command line).

Figure 7:
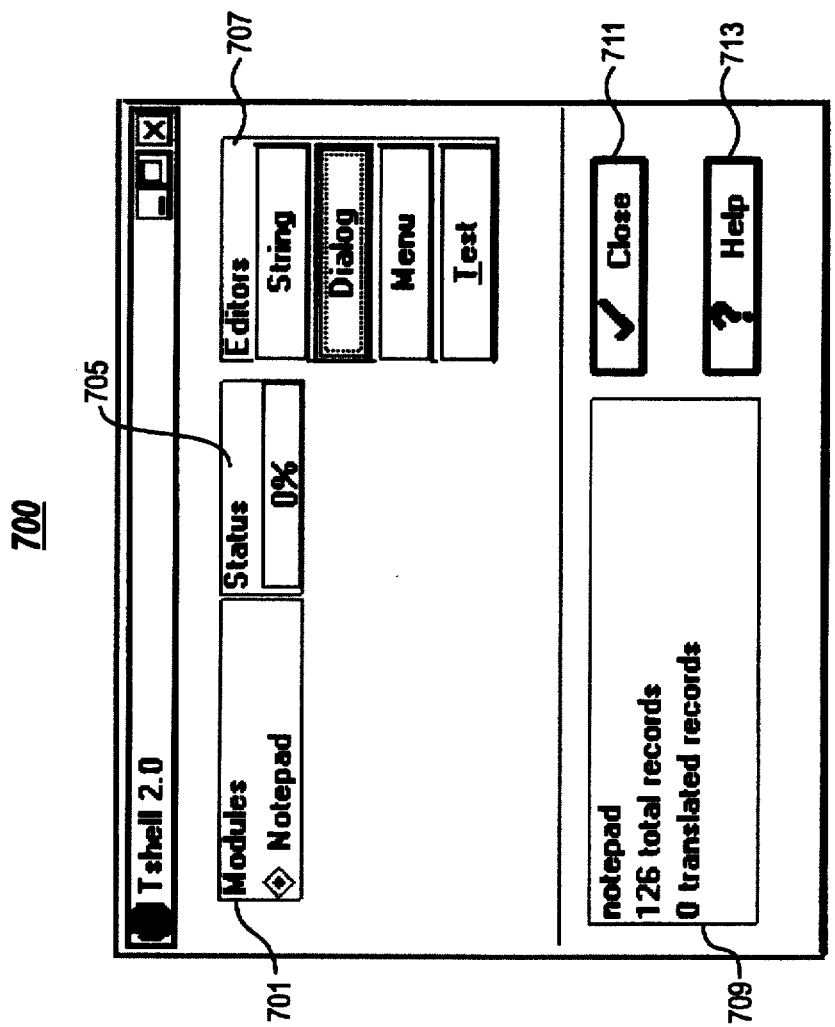
FIG. 7 is a bitmap screenshot illustrating a TShell dialog interface, which serves as a front end for operating the system.

FIG. 7 illustrates a TShell dialog interface 700. The dialog includes a module list 701, status box 705, editor buttons 707, status information 709, close button 711, and help button 713. The modules list 701 lists all active modules which have been loaded for translation. Since this example focuses on Windows Notepad, the word "notepad" appears in the list, as shown. Status box 705 lists how much of the product has been translated. Since no translation has occurred yet, the box displays "zero percent." Editor buttons 707 display screen buttons for launching the various editors which are used for translating the target program. Status box 709 displays current status information, such as how many total records have been created by parsing the resources for the target program. Finally, the close button 711 is used to close the dialog 700, and the help button 713 is used to invoke context-sensitive help for the interface. Next, use of the various editors will be described.

4. Editors

Since the majority of time spent by a user translating a product will be spent in use of the editors, editors should be easy to use and consistent from one project to another. Although the following discussion focuses on editors embodied in a Microsoft Windows implementation (i.e., one using Windows .RC resource files), it should be noted that these editors function entirely independent of the particular implementation. In particular, since the editors draw information from and store information back into the Translation Table 340, the editors themselves are independent from the underlying implementation (which may have particular proprietary formats for storing its resources).

(a) String Editor

Figure 8A:
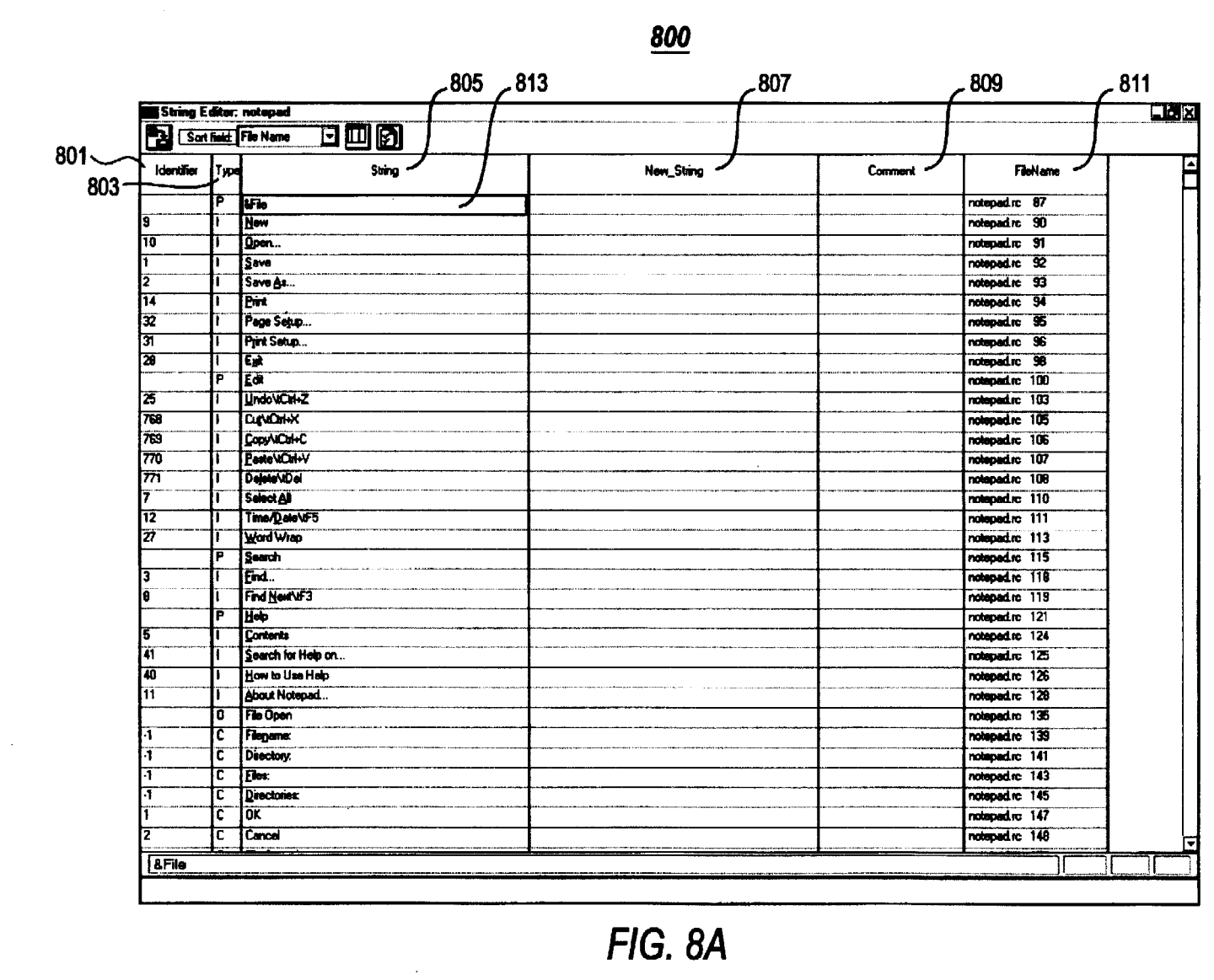

Generally, end user translators first work with the string editor to carry out bulk (i.e., large scale) translation of strings. Upon the user selecting the "string" button from editor buttons 707, the system displays String Editor 800, shown in FIG. 8A. The string editor displays the original string in a grey box above a white edit field where the translation is entered. The original string is displayed with a white background to make whitespace discernible. Strings are displayed sorted according to the current Windows country setting, and ignoring leading whitespace and &s (the Windows hotkey character), although these are displayed as a part of the string.

The String Editor 800 displays all the translatable strings, as well as context information, for the product to be translated. In particular, for each translatable resource having a string, the editor includes fields for displaying and editing an Identifier 801, Type 803, (original) String 805, New String 807, Comment 809, and FileName 811. The Identifier, Type, and String information are read in directly from the Translation Table. FileName information 811, which is also read in from the translation table, displays information about the particular resource file (e.g., file name and line number) from which the resource originated. Using field selector 813 and standard cursor positioning technique, the end user translator may easily enter new text strings into field 807, for the various resources having translatable strings.

All standard Windows-editor functions are supported (Cut, Paste, Undo, and the like) available from their standard CUA hot keys or by use of a popup menu which appears with a right-mouse click on the editor window. A "Find next untranslated option" is also available through the menu or the accelerator Control-N. This moves the cursor position to the next blank input line. Search on both the original and translated fields and search and replace on the translated fields are also available. Options can be set for case-sensitivity and for the support of regular expressions using GREP-like wildcards.

Since the translator should be provided with as much information as possible about these potentially obscure strings, the editors in the system of the present invention provide information about the location where the message appears, its maximum length, its context information, and other such information which assists the user with translating the message. In the String Editor, for instance, the end-user translator can enter various comments into the comment field 809, for explaining a particular translation (or even explaining why a particular item should not be translated). Upon completing bulk translation of strings, the end user translator closes the string editor 800. This new information provided by the user is written back to the Translation Table 340.

(b) Menu editor

Ideally, a Menu Editor provides a user with a context translation. In other words, the translator is able to see how the item will appear on the final product as the translation is done. One problem in translating menus, for instance, are "pick letters"—"hotkey" letters which allow "short cut" selections from a menu. Since the translator must ensure that all "pick letters" are unique, he or she must also be able to change "short cut" selections. Thus, a menu editor should emulate the real menu, as well as warn the user of any pick-letter conflicts.

While the string editor provides bulk translation of strings, the menu editor (as well as the dialog editor, described below) provide "in situ" or "live" translation of the target resource. Specifically, since the translation table also maintains other "translatable items" (such as dimension information), the system of the present invention can create the look and feel of a particular resource on screen while the end user translator is carrying out the translation.

Figure 8B:
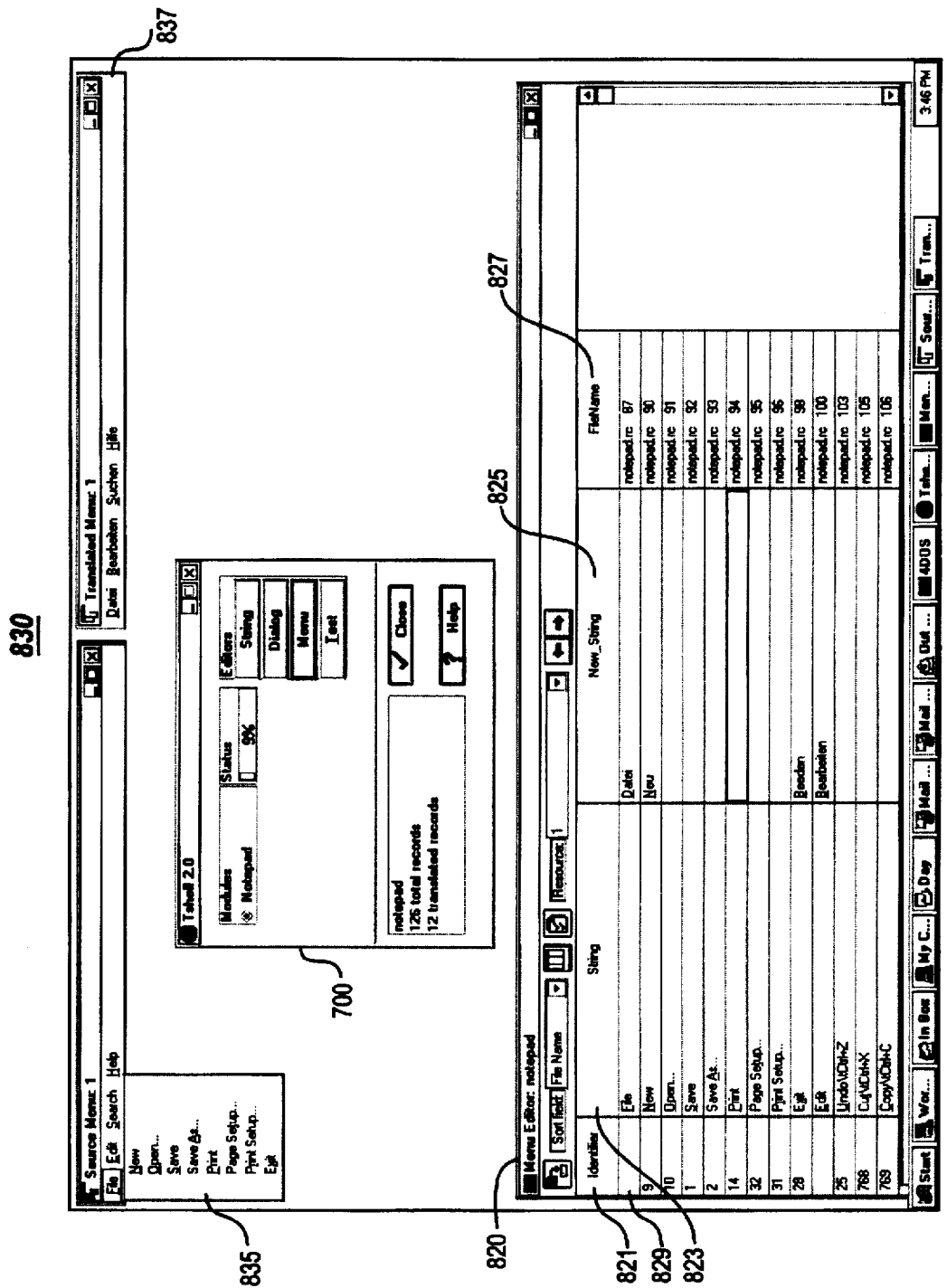
FIG. 8B is a bitmap screenshot illustrating a menu editor of the present invention.

The Menu Editor 830 shown in FIG. 8B displays a String Editing Window 820 in the lower part of the screen, and two smaller windows 835, 837 on its upper part. The String Editing Window 820 comprises an editing work surface having Identifier 821, String 823, New String 825, and File Name 827 fields. The menu window 835 on the left hand side displays a representation of the original menu; this menu is constructed directly from the menu resource information stored in the translation table. The menu window 837 on the right displays a representation of the translated menu. As the end user translator moves the field selector 829 (e.g., using cursor positioning technique) the corresponding visual representation of the resource is selected as well. For instance, selecting an "Open" string in Editing Window 820 causes the File|Open menu item to be selected from the source menu 835.

Selection of a popup menu in either the original menu window or the translated menu window results in the string associated with that menu being displayed at the current cursor position in the string editor. Selecting a non-popup menu item in either menu displays window results in that item being displayed at the current cursor position in the string editor, and the string editor is given the input focus. Changes to the translated menu are made as soon as the changed string in the string editor loses the input focus. Upon the user typing in a new text string in the field 825, for instance, the translated menu 837 illustrates the result. In this fashion, the end user translator performs a translation on a "live" interface and is thus able to immediately see the results as he or she performs the translation.

(c) Dialog editor

Dialogs present an additional complication. Not only must text strings be translated but also dimensions of the underlying dialogs need to be translated as well. Specifically, as a string gets translated its control in the dialog box might not be large enough to contain the new string (or may be too large, and thus can occupy unnecessary space). Accordingly, the dimensions associated with a text control need to be monitored and modified when necessary.

As dimensions are typically not as easily translatable by the translator as strings, a dialog box editor should provide a mechanism for either visually resizing of the UI element (e.g., through emulation), or automatically resizing. This aspect can be particularly challenging as dynamically-generated dialog boxes might not be statically presentable.

A dialog box editor should include safeguards to not allow a translator to change other aspects of the dialog. For instance, the translator should not be able to alter the styles or classes of either the dialog itself or the controls (i.e., screen buttons) in the dialog; nor should the translator be allowed to alter the "tab order" (i.e., the internal representation of the order of the controls kept by the dialog box).

Figure 9A:
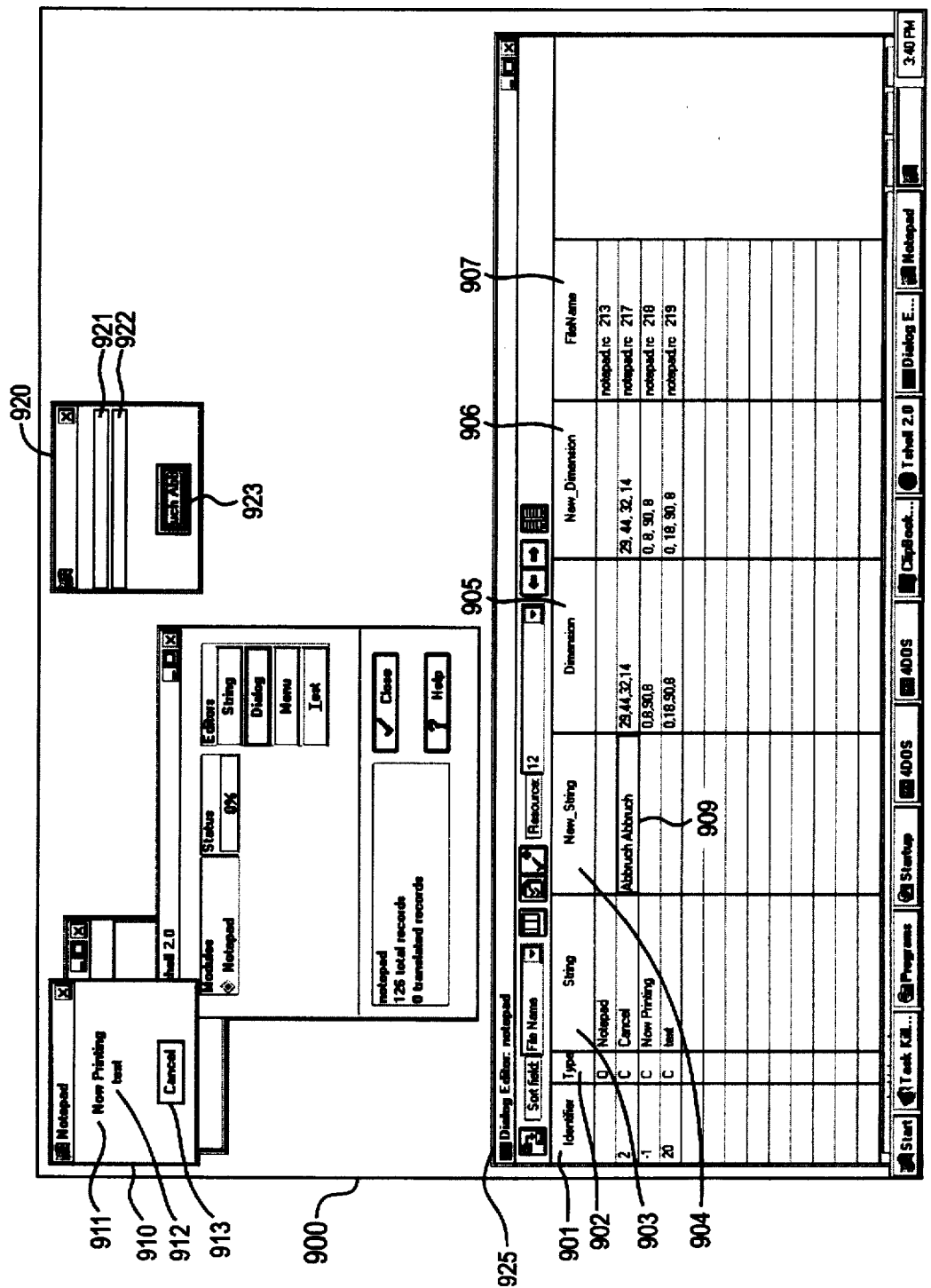
FIGS. 9A–B are bitmap screenshots illustrating a dialog editor of the present invention.
Figure 9B:
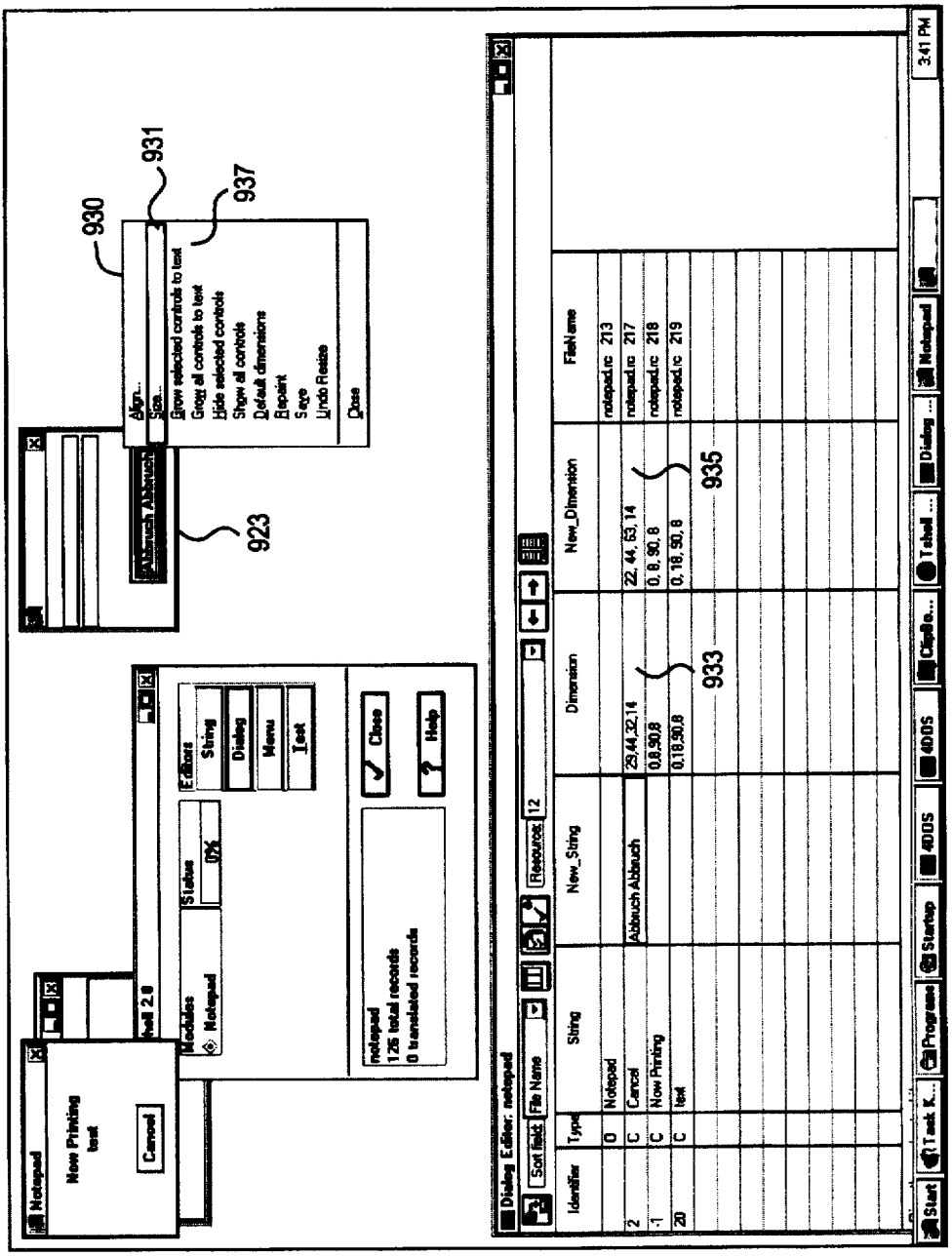

The Dialog Editor is illustrated in FIGS. 9A–B. The Dialog Editor displays a String Editing Window 925 in the lower half of the screen, and two dialog boxes 910, 920 on the upper half. The Source Dialog 910 on the left represents the original dialog box (i.e., Windows Notepad's "Now printing text" dialog, for the instant example); the Target Dialog 920 on the right represents the translated dialog box. The Dialog 910 contains the following resources (i.e., resources for which it is the father): Static Text Resource 911, Static Text Resource 912, and Button Resource 913. The system displays in the Dialog 920 the following corresponding resources: Static Text Resource 921, Static Text Resource 922, and Button Resource 923. Initially, Resources 921, 922, 923 are devoid of any text string, and all dimensions in the translated dialog box are the same as those in the original dialog box. As in the case with the Menu Editor, the Dialog Editor 900 displays "live" images of both source and target.

The String Editing Window 925 displays the following fields: Identifier 901, Type 902, String 903, New String 904, Dimension 905, New_Dimension 906, and FileName 907. The Identifier, Type, String, New String, and FileName fields function in a manner similar to those previously described for the String Editor. Note, however, that the dimension of a resource is treated as a translatable item. Therefore, the Dialog Editor 900 includes the Dimension Field 905 which displays the various dimensions for a resource (using diagonal x,y coordinate) and the New Dimension Field 906, which may receive new values from the end-user translator.

The end-user translator may then proceed to select each resource desired to be translated and type in a New String. As shown in FIG. 9A, for instance, the user may select the New String Field 909 for the "cancel" button and type in a New String, as shown at 909. Simultaneous with the end-user's entry of a New String, the corresponding control (i.e., Button Control 923) is updated to display the New Text String.

The translated dialog box has editable controls, which can be moved and resized as necessary. Left-mouse-clicking on a control makes that control active and highlighted by a black box. The active control can then be moved or re-sized. Pressing SHIFT and left-selecting multiple controls makes those controls active and highlighted by a black box. These controls can then be moved as a group, or be aligned/sized according to the align and size dialog boxes. Moving a control or group involves pressing the left mouse button while the cursor is inside the black selection box (the cursor will assume a cross-hair shape) or using the arrow cursor keys.

Resizing a control manually involves pressing the left mouse button on either: (1) the bottom of the highlighted control (the cursor will be an up-down double-headed arrow) for vertical resizing; or (2) the right side of the highlighted control (the cursor will be a left-right double-headed arrow) for horizontal resizing; or (3) of the bottom-right corner of the control (the cursor will be a diagonal double-headed arrow) for both horizontal and vertical resizing.

Modifying the display properties (e.g., automatic re-sizing) of the translated resource is accomplished as shown in FIG. 9B. The end-user translator may request property inspection of the control 923 (e.g., by "right-clicking" on it), where upon the system displays Object Popup Menu 930. The popup menu includes the following options:

Align . . . : Selecting this option produces a dialog box with options for aligning controls and groups of controls.

Size . . . : Produces a dialog box with options for resizing controls and groups of controls.

Grow selected controls to text: Automatically resizes selected control(s) to fit the translated text.

Grow all controls to text: Automatically resizes all controls to their text strings.

Hide selected controls: Temporarily hides control(s) from view (to simplify editing of other objects).

Show all controls: Restores hidden control(s).

Default dimensions: Restores a control to its default dimensions.

Repaint: Forces a repaint of the dialog in case any information had been corrupted.

Save: Forces a write of any changed dimensions to disk.

Undo <operation>: Will undo the last <operation>. <operation>is the last action performed on the dialog box—selection, resize, move, and the like.

Selecting the Align or Size items produces a dialog box with options to align or size the selected control or controls horizontally or vertically. Certain options only apply to multiple selections. For resizing the control, for instance, the end-user translator selects the "Size" menu item 931. Upon the user selecting this option, the system displays a "Size Controls" dialog (not shown). The Size Controls dialog is where the starting point, the height, and the width of controls are specified in the dialog box. It includes two columns of buttons: Horizontal Size radio buttons and Vertical Size radio buttons. Horizontal Size radio buttons are selected to size the width of the selected controls; Vertical Size radio buttons size the height of the selected controls. Exemplary options include:

No Change: The No Change radio button is selected if the user does not wish the controls to change size horizontally.

Grow To Largest: The Grow To Largest radio button resizes controls horizontally so that they are as wide as the widest control in the selected group.

Width Of Size Box: The Width Of Size radio button resizes controls so that they are as wide as the sizing frame.

Width Of Dialog: The Width Of Dialog radio button controls so that they are as wide as the dialog box.

No Change: The No Change radio button may be used if the user does not wish the controls to change size vertically.

Shrink To Smallest: The Shrink To Smallest radio button resizes controls vertically so that they are only as tall as the shortest control in the selected group.

Grow To Largest: The Grow To Largest radio button resizes controls vertically so that they are as tall as the tallest control in the selected group.

Height Of Size Box: Turn on the Height Of Size radio button to resize controls so that they are as tall as the sizing frame.

Height Of Dialog: Turn on the Height Of Dialog radio button to resize controls so that they are as tall as the dialog box.

Changes to the strings in the Dialog Editor are preferably saved as soon as the input item loses focus; this change is immediately reflected in the translated dialog on the screen. Changes to dimensions of any of the controls are saved when the Save menu option is selected. As shown at 935, the "New Dimension" field is updated for receiving the new dimensions for the re-sized control; the original dimensions continue to be displayed in the "Dimension" field, shown at 933. If the dialog is closed after modifications are made but before the changes have been saved, a dialog box asking if the changes should be saved appears.

(d) Bitmap and icon editor

Any bitmap that appears in a product should ideally be international. Specifically, such bitmaps and icons should not contain country-specific information (e.g., such as a baseball hat representing a coach). Literal strings should also be avoided in bitmaps and icons. A commercial bitmap editor (not shown), such as Borland's Resource Workshop, may be employed in the system for editing icons and bitmaps, as desired. Such an editor may easily be added to the system through the TShell configuration file.

5. Exemplary translation of resource

Figure 10A:
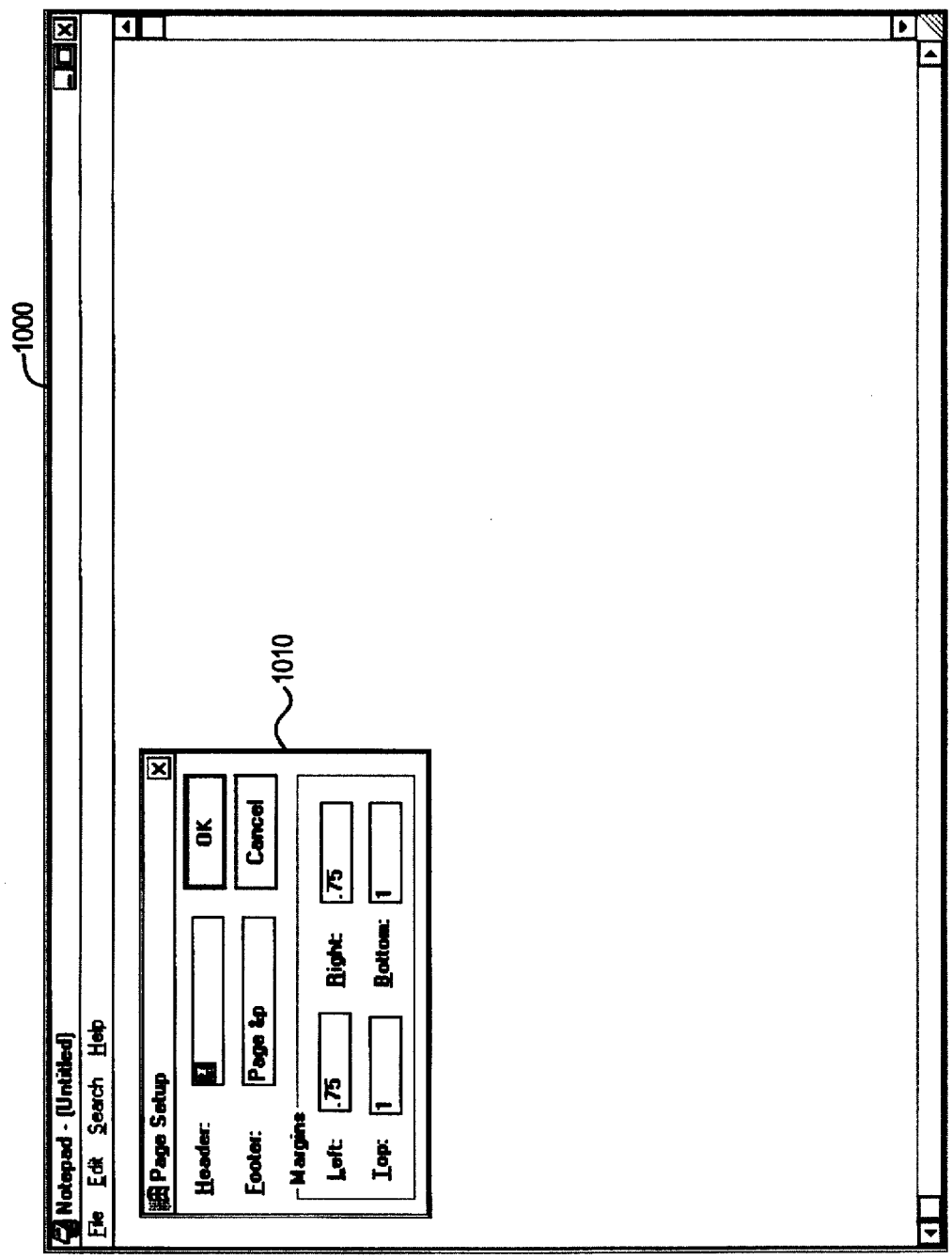

FIG. 10A illustrates the Page Setup Dialog 1010 from the Windows Notepad Application 1000. Use of the system of the present invention for translating this dialog from English to German will now be illustrated.

Figure 10B:
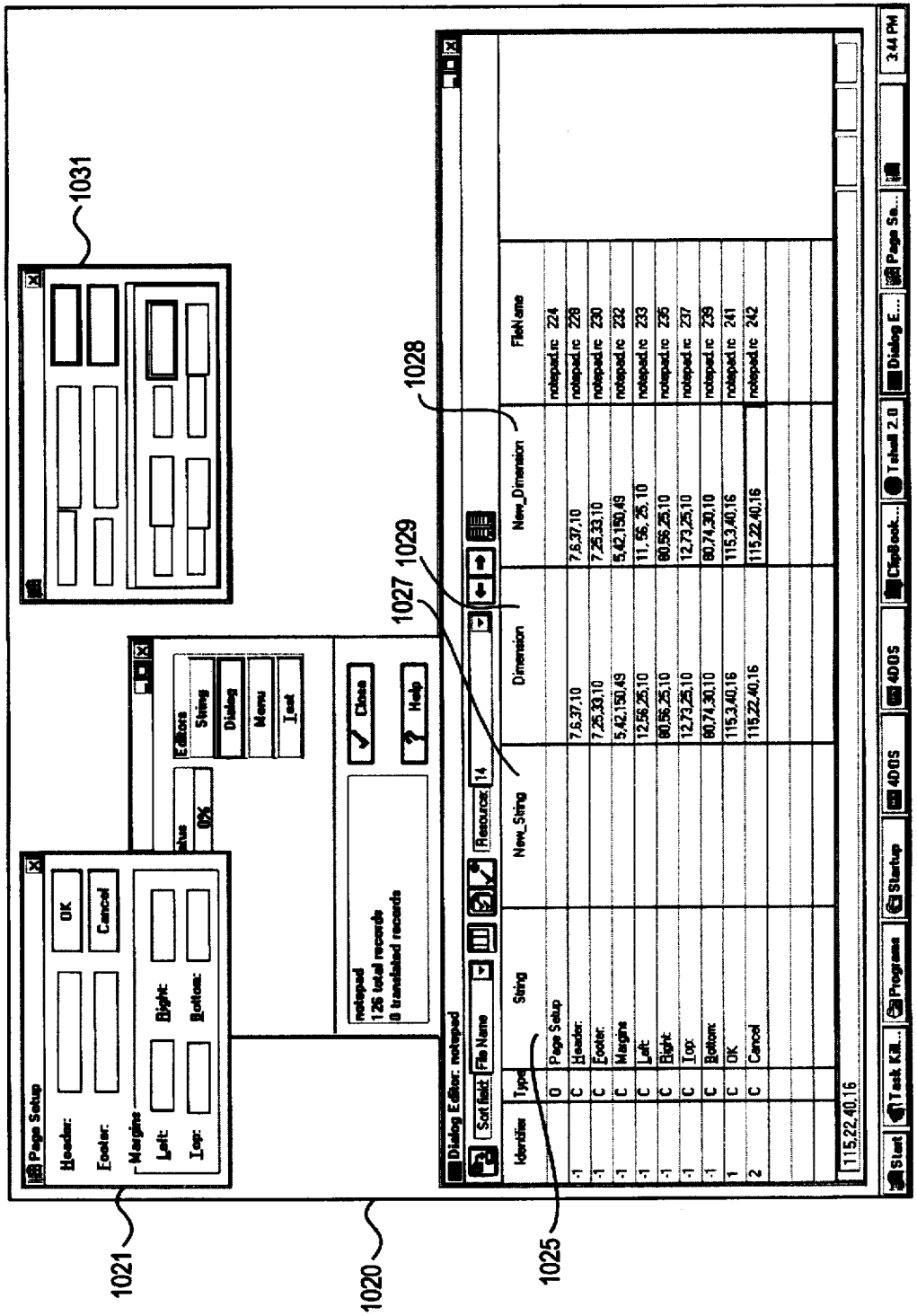

FIG. 10B illustrates the Dialog Editor 1020, with the "Page Setup" dialog loaded. In particular, Editor 1020 displays Source Dialog 1021 and Target Dialog 1031. The original, English strings for the dialog are shown in the String field 1025. At this point in the example, no new strings have been entered and, therefore, the new string field 1027 appears empty. Similarly, the New Dimension field 1028 stores the same dimension (coordinate values) as the Dimension field 1029.

Figure 10C:
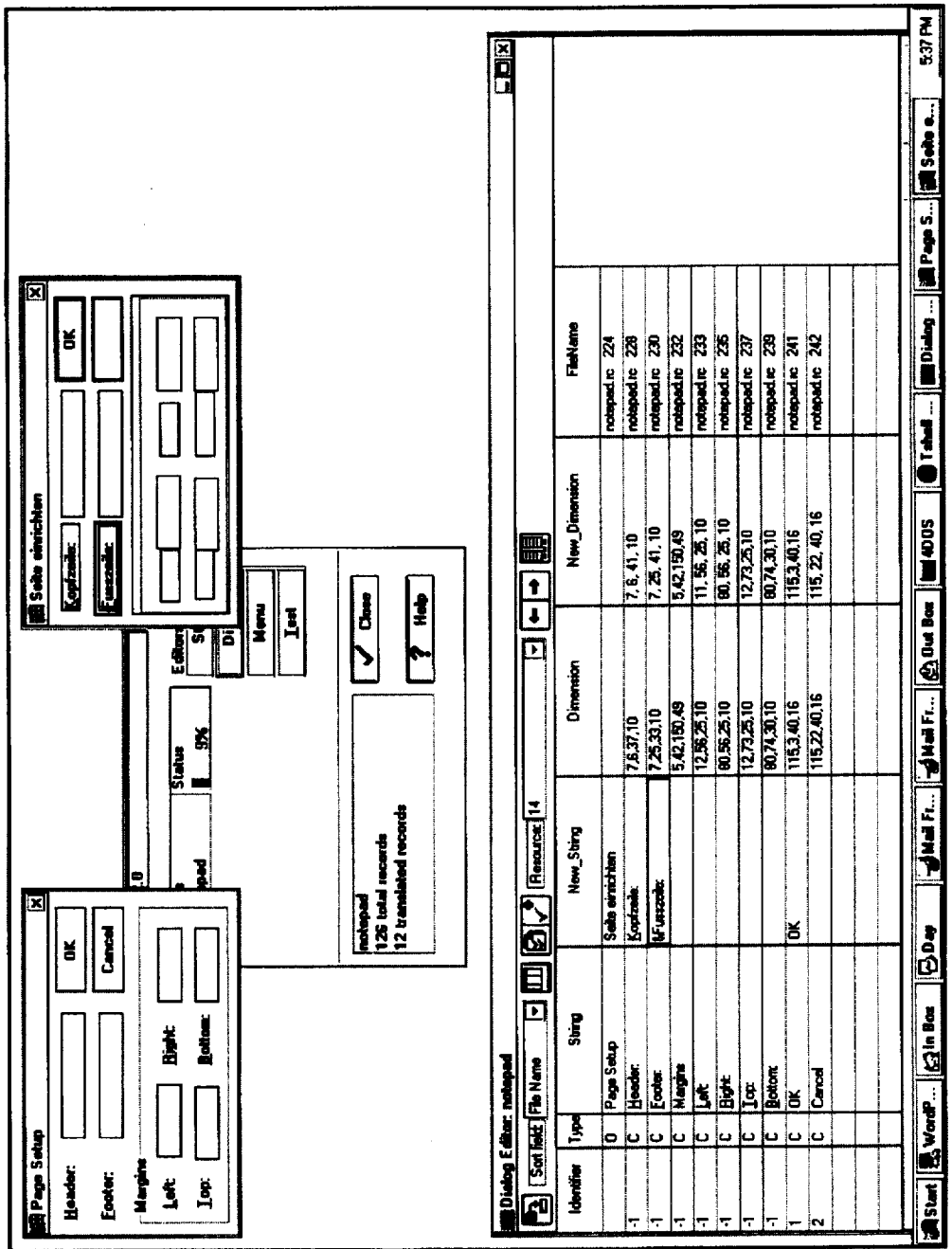
Figure 10D:
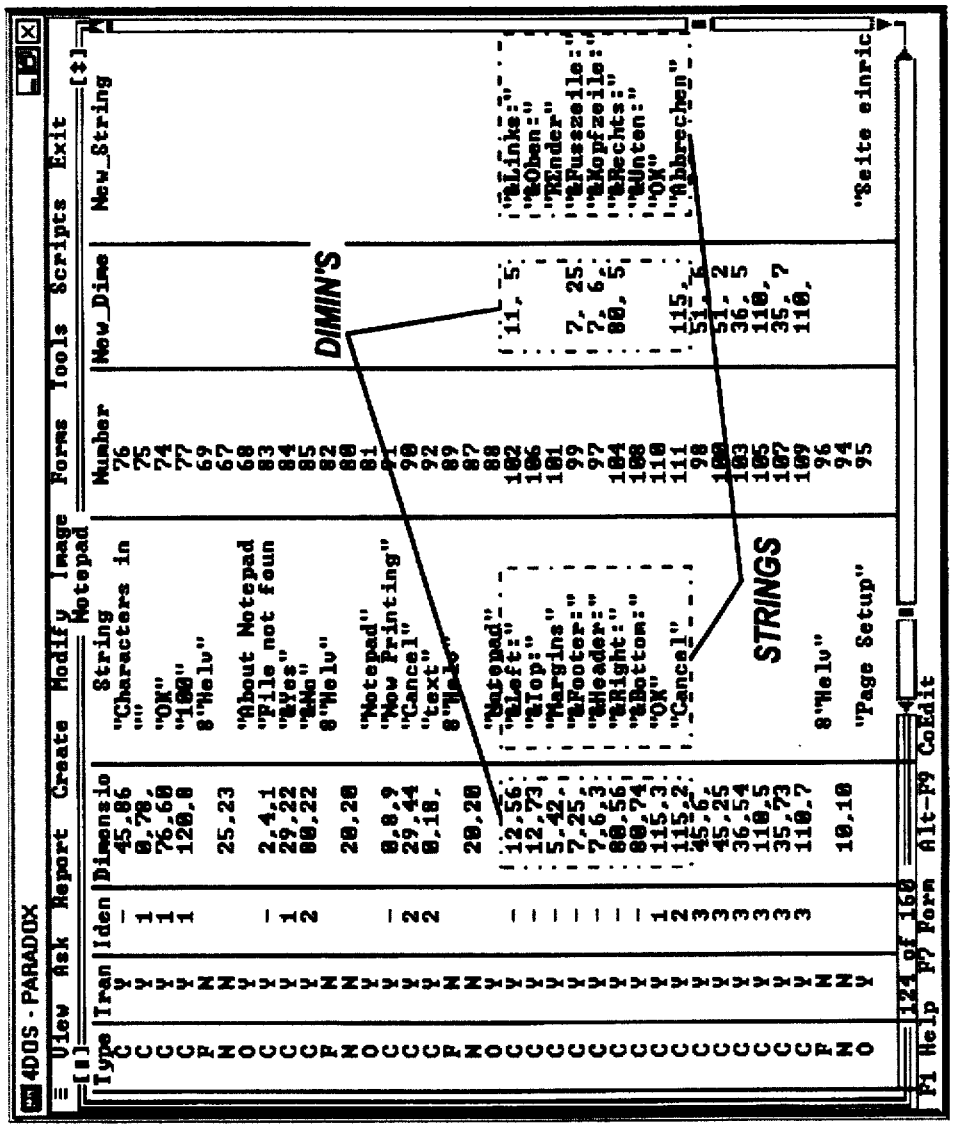
Figure 10F:
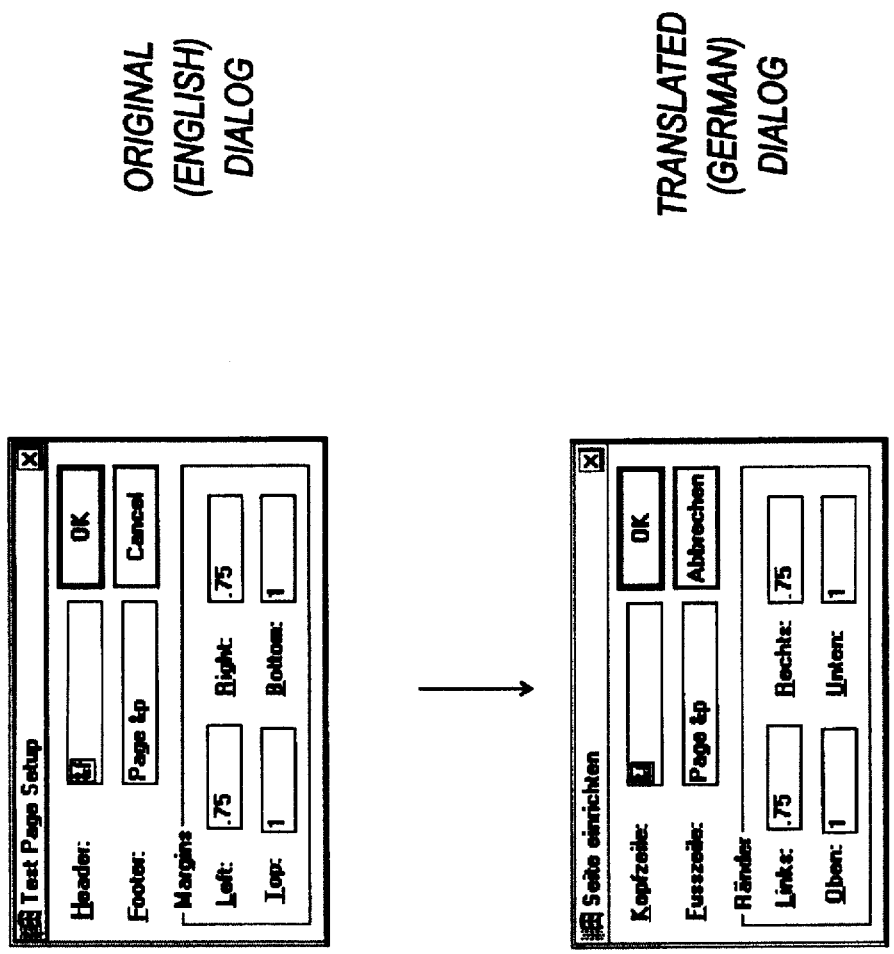

After the end-user translator has interactively translated the various resources, the Dialog Editor (now 1020') appears as shown in FIG. 10C. Note, for this example, that new values have been entered into the New String field and the New Dimension field. In conjunction with these changes, the Target Dialog has been updated to display the new (translated) strings. Similarly, the underlying Translation Table, Table 1050 shown in FIG. 10D, has been updated with the New String and Dimension information. The Translation Table may then be used, in turn, to write out a new resource file, such as the resource file in FIG. 10E (shown compared with the original file). The translated resource file may itself be used, in turn, to build a new translated product. FIG. 10F shows the translated dialog of the final product.

Internal operation

A. Overview

The Export/Import module includes a parsing engine to extract strings and translatable information from application programs. In a windows environment, for instance, the module includes a generic parser for processing Windows .RC files. Thus, it functions as a front end parser to "translatable" sources, providing data conversion as needed. Preferably, it provides upgrade functionality as follows. When as new set of files are parsed, instead of extracting to another table, the module updates any existing translation table with the new strings found in the new files.

B. Data container

Information extracted by the Export/Import module is stored in the Translation Table database which comprises a table having three major field types: token, English/source, and translation. The token field is a field or collection of fields that makes a given record unique. This is provided to insure that a given record is uniquely represented so that it can be used in data manipulation, merges back to sources, upgrades between versions, and the like. The English/source field stores strings, dialog coordinates, accelerators, and the like found in the sources of the starting language (e.g., English). These entries represent the elements that will differ between the "source language" base product and the "translated" product. Translation fields are fields where the translator enters strings, coordinates, and the like which should replace the ones in the "English" field. Data entry can occur either directly at the database, or by using a translation front end ("Editor").

Other field types include context information, sequential, comments, and user interface. The context information field stores information about the classification of a given string, such as whether it belongs to a menu or dialog. The sequential field is used to determine the context in which other strings are a part. The comment field stores comments which are extracted from the source, so that explanation or limitations to a given string are available to the translator.

The specific internal layout of the Translation Table employed in a preferred embodiment is illustrated by the block diagram in FIG. 11. Its particular fields are as follows. The Father field stores the record number of the father of this control; a dialog control, since it has no father, stores zero in this field. The Type field indicates the type of control, such as Dialog (Type equal "D"), String Table (Type equal "S"), Menu (Type equal "M"), and the like. The Translatable field indicates whether an item is translatable (from one language to another). This is determined on the fly (as described by the methods below), based on the Type of the control. The Identifier field stores the resource identifier which is present in the original resource file. Similarly, the Dimension field and the String field store the original dimension and string, respectively, as they appear in the original resource file. The Number field stores a count value, which is used for internal tracking of the records by the system. The Class field stores the resource class, as it appears in the original resource file.

The Used field stores a flag for indicating whether this item (record) is used in the translation. When a resource is first imported, Used is set to "Y"es. Then during an update operation (described below), Used is set to "N"o. When a record is located during the update operation (i.e., a pre-existing record is found), Used is then again set equal to "Y"es. If Used is set equal to "I"gnore (which is usually set by the person charged with localizing the software), the record is ignored during update operations.

The FileName field stores the file name and line number where the resource can be found in the original resource file. The Comment field stores any comments embedded by the programmer in the original Resource file. Although not shown, a second Comment field may be provided for storing the translator's comments separately.

C. Preferred implementation

The following description of the Software Translation system of the present invention will focus on the presently preferred embodiment which includes components implemented in an event-driven Windows architecture with the C++ programming language. In particular, an object-oriented model is adopted whereby new objects (e.g., "Dialog" objects) may be derived from existing base classes (e.g., "Item" base class). The general features of C++, including data encapsulation, inheritance, and polymorphism, as well as C++ techniques for implementing class hierarchies and class methods are known; see e.g., Ellis, M. and Stroustrup, B., *The Annotated C++ Reference Manual*, Addison-Wesley, 1990. Additional information about object-oriented programming and C++ in particular can be found in Borland® C++: 1) *User's Guide*, 2) *Programmer's Guide*, and 3) *Library Reference*, all available from Borland International of Scotts Valley, Calif. The disclosures of each of the foregoing are hereby incorporated by reference

1. "Item" C++ base class

The Export/Import module is implemented as a C++ base class. Each object instantiated from the "Item" class corresponds to a record stored in the Translation Table (as well as a resource read in from a resource file). In an exemplary embodiment, a class of "Item" may be defined as follows:

```
// Item class definition
// Base class for all translatable resources
class Item {
protected:
    char concatLines; // remember the initial value of
        //WordFlux::concatlines
    ItemRecord *Fields;
        // Contains all
        //information
    Item *Father;
    PreprocessedFlux *Flux;
    ItemTable *Table;
    PreprocessedFlux *GetFlux()
    {
        if (Father) return Father->GetFlux();
        return Flux;
    }
    ItemTable *GetTable();
    // RECORDNUMBER is a define from pxengine.h (avail. from
    Borland)
    RECORDNUMBER GetRecordNumber();
    RECORDNUMBER GetFatherRecordNumber();
    virtual void FillFields()=0;
        // pure virtual functions overwritten by all the subclasses
        // that actually do the work
    virtual void UpdateFile()=0;
    virtual void CreateChilds()=0;
public:
    Item(ItemTable *T,PreprocessedFlux *F);
    Item(Item *I);
    virtual ~Item();
    ItemRecord *GetFields()
    {
        return Fields;
    }
    static DATE Today;
        // Paradox date structure
    static int NumberProcessed;
        // Housekeeping variables
    static int NumberTranslated;
    static int NumberTranslatable;
    static int NumberAdded;
    static char WindowRC;
    // 1 == windows, 0 == os/2
    static char DisplayIdentifiers;
    // Display resource identifiers
    static char ParseIDs;
    // store numeric values of identifiers
    static char JapaneseConversion;
    // character set conversion routines
    static char TaiwanConversion;
    static char FontTranslate;
    virtual void Build();
    // routine to call FillFields, UpdateFile and CreateChilds
};
```

ConcatLines is a data member used for concatenating lines of text. Fields is a pointer of type ItemRecord, which points to a record storing all the information for this item (i.e., self). Father is a pointer of type Item which points to the owner for this record (item). If this item is a parent itself, then the Father pointer is set to null. A dialog box is one example of a resource which is a parent. If, on the other hand, the resource is a child, then the pointer points to the Father for the resource. Flux is a pointer of type PreprocessedFlux; it is employed for file processing. Table is a pointer of type ItemTable; this points to the underlying translation table itself.

GetFlux, GetTable, GetRecordNumber, and GetFatherRecordNumber are methods for processing the records. Their functionality is self explanatory (e.g., GetRecordNumber returns the record number for this item).

Next are three virtual methods: FillFields, UpdateFile, and CreateChilds. Each is a pure virtual function, meaning that it will be overwritten by a subclass which, in turn, does the actual work. For instance, a Dialog is derived from the Item class, as will be illustrated below. The Dialog class declares a FillFields method (overwriting the virtual definition), which includes steps specific for filling fields of a dialog-type resource.

The UpdateFile method is employed for updating a resource file with the translated strings (which the enduser translator has typed into the new string fields). Since this is specific for each resource type, the method is defined as a pure virtual function in the item class. The method is overwritten (in the subclasses) as needed for servicing each resource type.

The method CreateChilds is, like the above two functions, a pure virtual function. It serves to identify children of a resource, by scanning for particular identifiers in a given input stream. As with the other virtual functions, its particular implementation is resource-specific. Accordingly, it is defined in the Item class to be a pure virtual function, with each different subclass (resource type) providing a resource-specific implementation for the method. For a dialog input stream, for example, the identifier "Control" signals a child for the dialog. In a similar manner, for a menu input stream, the corresponding method would look for a "popup" identifier.

Continuing with the description of the Item class definition, next are the public methods and data members. The Item class includes constructors and a destructor for initialization and cleanup, respectively. GetFields, the next public method, simply returns a pointer to Fields, which is a protected data member of type ItemRecord.

Following these public methods are public data members whose functionality is largely self-explanatory. Today is a data member of type DATE (a Paradox data type), for tracking the current date. NumberProcessed, NumberTranslated, NumberTranslatable, and NumberAdded are housekeeping variables whose functionality is self-evident (e.g., NumberTranslated tracks the number of records translated). WindowRC is a flag for tracking whether the target platform is Microsoft Windows or IBM OS/2. DisplayIdentifiers is a flag for indicating that the system is to display resource identifiers as resources are read. ParseIDs stores numeric values of identifiers (for storage into another field of the table). JapaneseConversion and TaiwanConversion are flags for indicating that a double byte character set (and related conversion routines) is employed, for appropriate treatment for those locales. FontTranslate is a flag for indicating that the font (statement in the resource file) is treated as a translatable item as well. Finally, the class definition concludes with a Build virtual method which is used by the various subclasses to call the above-described FillFields, UpdateFile, and CreateChilds.

2. DoExpimp (main) method

Figure 12A:
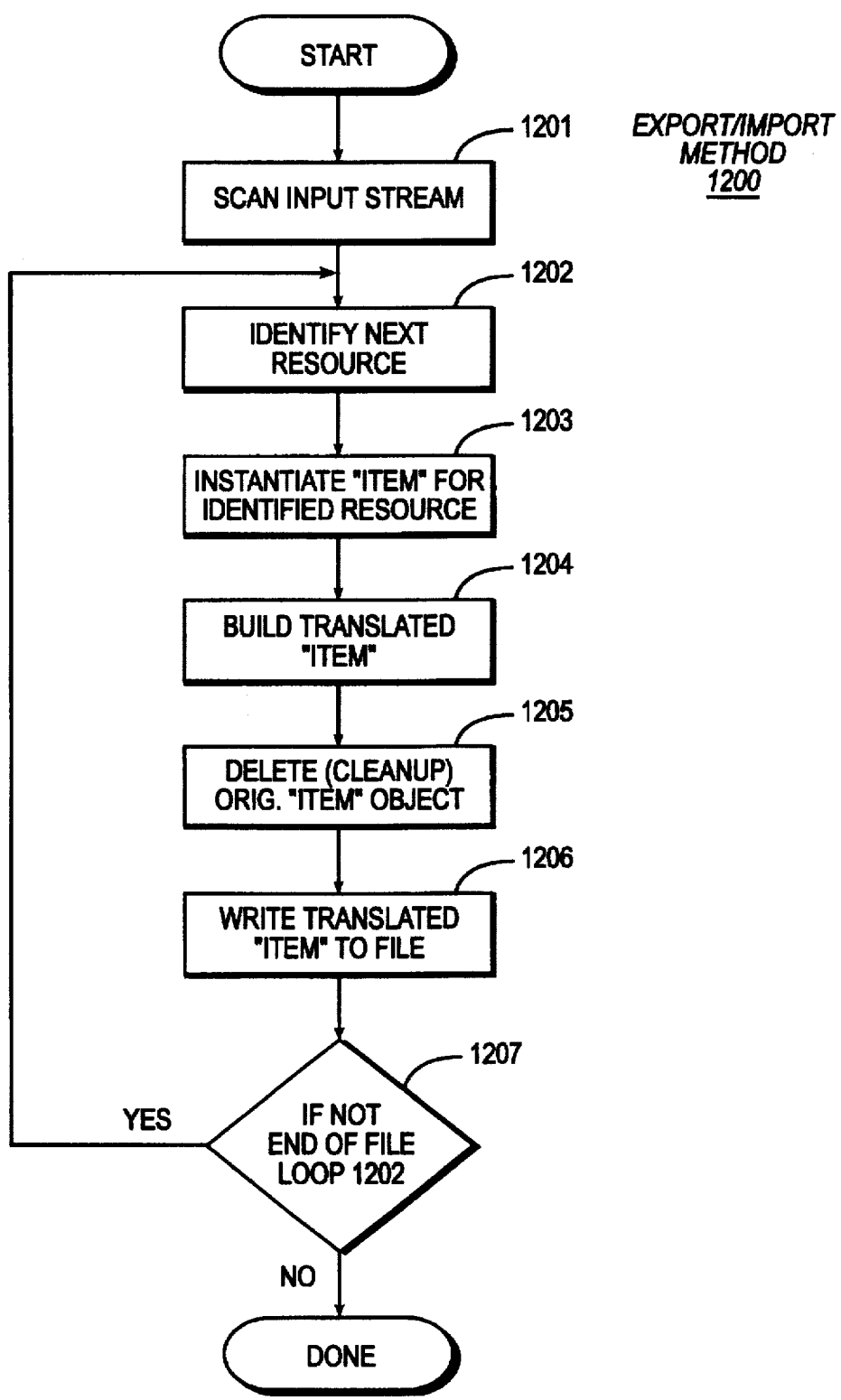
FIG. 12A is a flowchart illustrating an Export/Import method of the present invention.

FIG. 12A illustrates an Export/Import (DoExpimp) method 1200 of the present invention, which serves to import resources into and export resources from the translation table. At step 1201, the method scans the current input stream, PreprocessedFlux, looking for resources. The method scans the string looking for words it recognizes. As soon as a word is recognized (e.g., "MENU"), the function proceeds to create an "Item" of that type. Specifically, the next resource is identified at step 1202 and an object is instantiated from the "Item" class (for the identified resource) at step 1203. At step 1204, the method builds a translated item. The step represents invocation of a "Build" method for each object of class item created. The Build method in turn, invokes FillFields, UpdateFile, and CreateChilds methods for that resource. At step 1205, the "Item" object is deleted. At step 1206, the translated "Item" is written to file. At step 1207, the method loops back to step 1202 if additional resources remain to be processed. Otherwise, the method has completed. Exemplary implementations for the Build, FillFields, UpdateFile, and CreateChilds methods are described in further detail below.

In an exemplary embodiment, an Export/Import (DoExpimp) method may be constructed, as follows (shown in annotated C++ listings):

```
// Reads the input stream one word at a time looking for the control
// types we are interested in
void DoExpimp(PreprocessedFlux *W)
{
    char PreviousWord[MaxWordLength];
    while (!W->eof ())
    {
        strcpy(PreviousWord,W->GetCurrentWord());
        if (W->GetNextWord())
        {
            char *currentWord = strdup(W->GetCurrentWord());
            {
            //...
            strupr(currentWord);
            if (!strcmp(currentWord, "MENU"))
            {
                Item *I;
                if (!Item::WindowRC)
                {
                    I= (Item *) new Menu(Table,W);
                }
                else
                {
                    I= (Item *) new Menu (Table,W,PreviousWord);
                }
                I->Build();
                delete I;
            }
            else
            if (!strcmp(currentWord, "STRINGTABLE"))
            {
                Item *I = (Item *) new StringTable (Table, W);
                I->Build()
                delete I;
            }
            //...
            else
            if ( !strcmp(currentWord, "DIALOG") ||
                !strcmp(currentWord, "DLGTEMPLATE") ||
                !strcmp(currentWord, "WINDOWTEMPLATE") )
            {
                if (!Item::WindowRC)
                {
                    // If we are parsing a Windows RC file,
                    // Get the Identifier
                    strcpy (PreviousWord, W->GetNextWord());
                }
                Item ** = (Item *) new Dialog(Table,W,PreviousWord);
```

```
        I->Build();
        delete I;
    }
    W->Flush(); // Write translated item to file
}
//...
delete [] currentWord;
            }
        }
    }
}
```

3. Build method

Figure 12B:
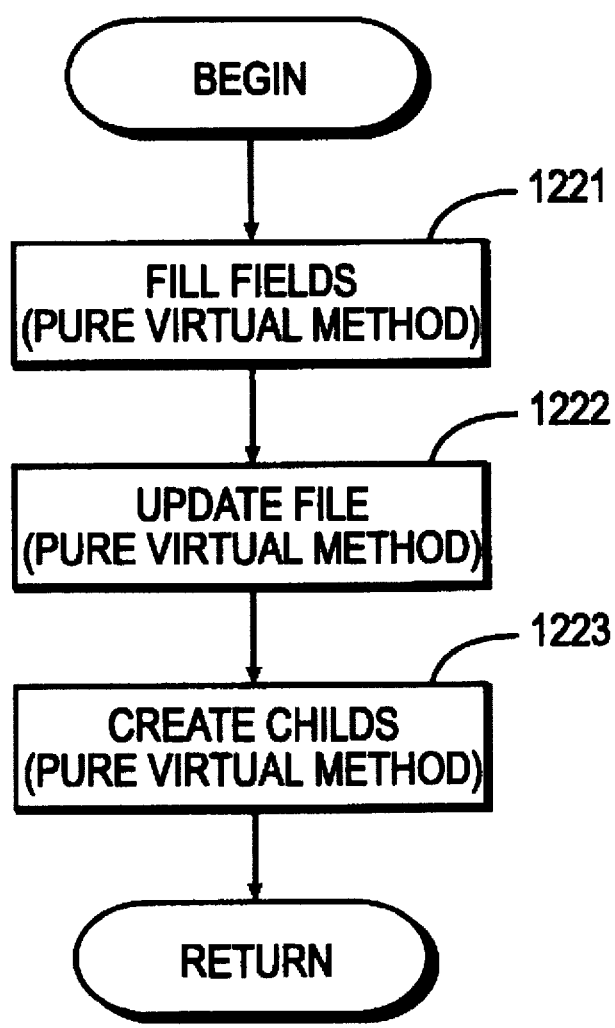
FIG. 12B is a flowchart illustrating a "Build" method of the present invention.

FIG. 12B illustrates the Build method 1220 (which corresponds to step 1204 of FIG. 12A). The method, which is a public method of the "Item" C++ class, functions as follows. At step 1221, the method fills the fields of the translation table, for this resource. In a preferred embodiment, step 1221 is implemented as a FillFields pure virtual method, so that each resource may implement its own particular steps according to its type. At step 1222, the method updates the file (Translation Table). Again, this is implemented as a pure virtual method in a preferred embodiment, so that each resource may implement a particular UpdateFile method for its particular type. At step 1223, the method processes any child controls for the current resource. A dialog box, for instance, may include child controls consisting of screen buttons, edit controls, and the like. Again, in a preferred embodiment, the step is implemented as a pure virtual method, CreateChilds, so that each resource may implement appropriate steps for its type.

Resource-specific implementations of the above pure virtual methods will now be described.

4. Dialog and Control Fill Fields methods

Figure 12C:
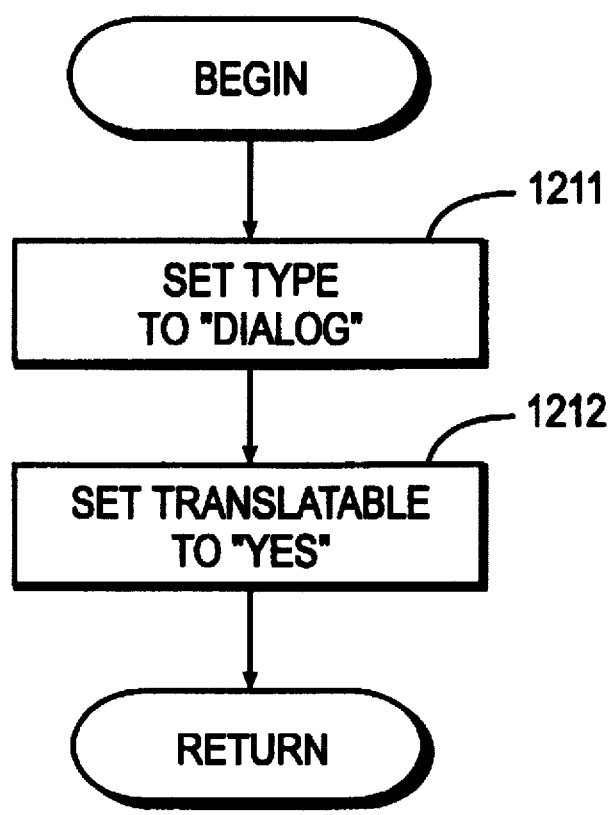
FIG. 12C is a flowchart illustrating a "FillFields" method of the present invention, for use with dialog controls.

FIG. 12C illustrates implementation of Dialog::FillFields—the FillFields method for a dialog resource. A dialog resource is treated essentially as a container for other resources (e.g., such as buttons, edit fields, and text). Even style information for a dialog resource (e.g., caption, font, and the like) is stored as various children, rather than in the record for the dialog. As a result, the information left for the dialog which is to be stored in the record is simple—the Dialog::FillFields method 1210 is implemented in just two steps. At step 1211, the method sets the Type to "D" ialog. Next, at step 1212, the method sets Translatable to "Y" es. At the conclusion of the step, the method 1210 returns.

In an exemplary embodiment, a Dialog Fill Fields method may be constructed, as follows (shown in annotated C++ listings):

```
// Dialog fillfields
void Dialog::FillFields()
{
    // Identifier is stored in the constructor
    // This is verysimple since most of the work is done in
    // CreateChilds
    strcpy(Fields->Type, "D");
    strcpy(Fields->Translatable, "Y");
}
```

Figure 12D:
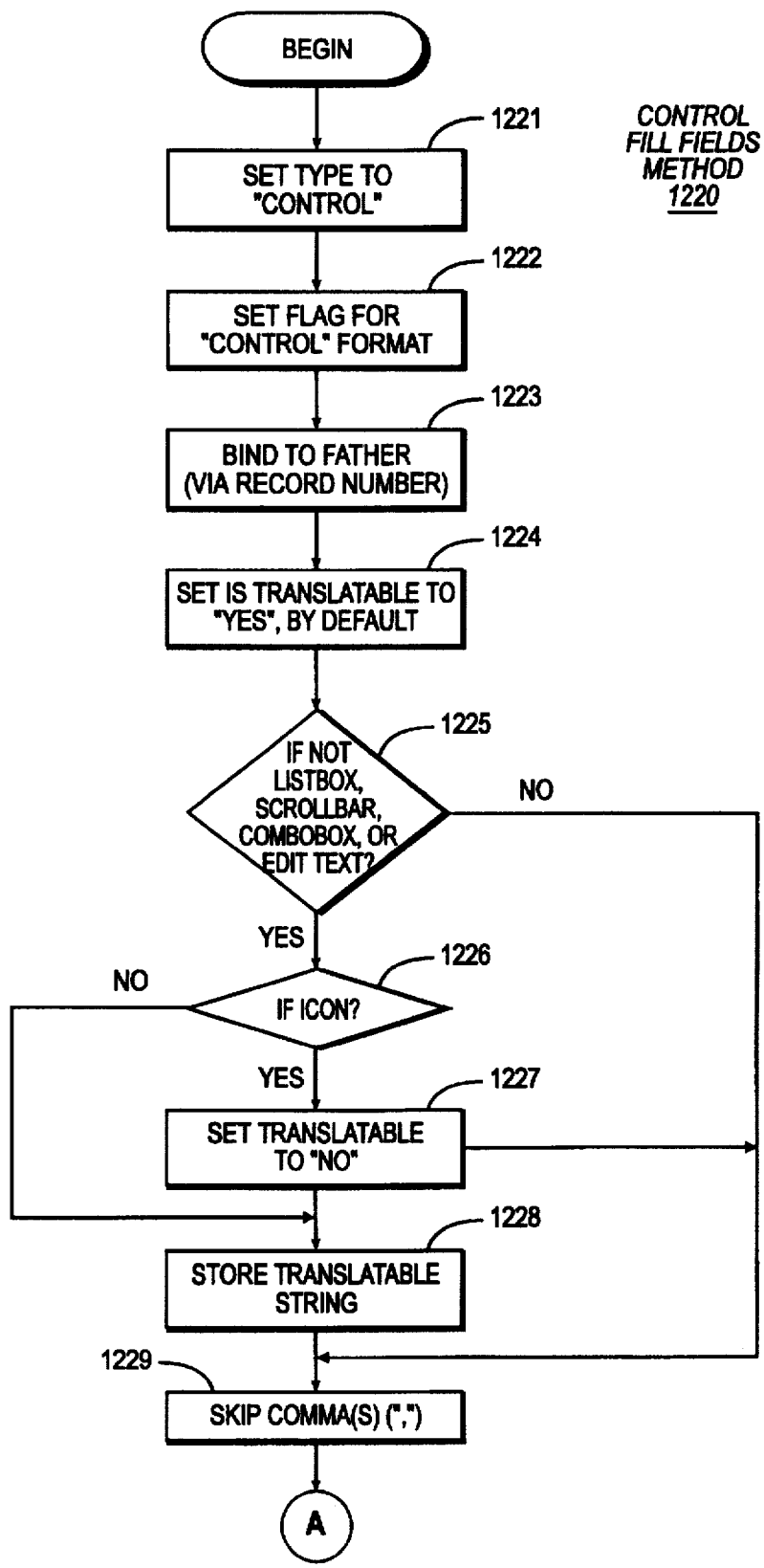
FIG. 12D is a flowchart illustrating a "FillFields" method of the present invention, for use with controls.
Figure 12D:
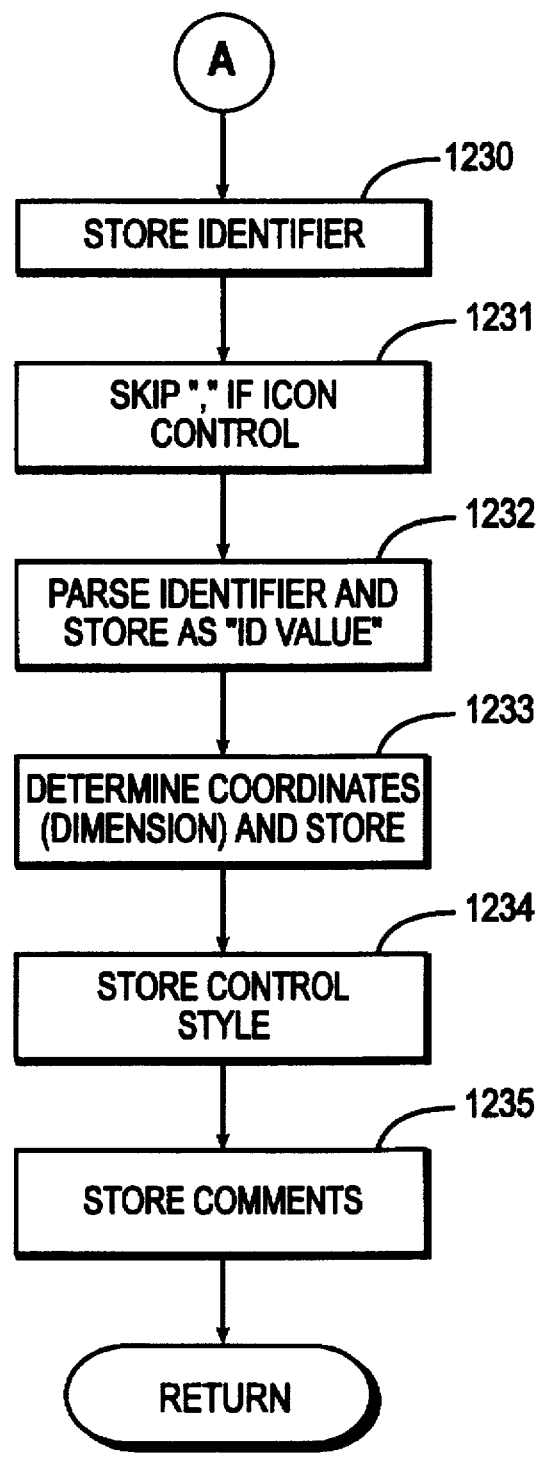

FIG. 12D illustrates Control::FillFields—a FillFields method implemented for controls. Control FillFields method 1220, which provides support for each control which may be placed inside a dialog resource, proceeds as follows. At step 1221, the Type is set to "Control". Depending on how the control is specified in the resource file (e.g., as "Control", "Edit text", "LText", and the like), however, the method must look in different places for pieces of information. Thus at step 1222, a flag (IsControlled) is set for indicating whether the control is specified in generic "CONTROL" style. At step 1223, the control is bound to its Father, by storing the record number for the Father in the "Father" field for this control. At step 1224, the "Translatable" field is set equal to "Y"es, by default.

At step 1225, if the control is not a ListBox, ScrollBar, ComboBox, or EditText, then the method proceeds to step 1226 to determine if the control is an icon. Otherwise, the method will proceed from step 1225 to step 1229. For the instance where the resource is an icon (Yes at step 1226), the method proceeds to step 1227 to set Translatable to "N"o. At step 1228, the method has determined that the resource is not an icon but, instead, a resource having a translatable string; the translatable string is stored in the table at this step. At step 1229 the method skips past any comma characters (","), as these may be treated as whitespace characters. At step 1230, the current position in the input string is at the identifier for this resource; the identifier is stored in the table at this step. At step 1231, the method skips past any comma character, if the resource is an icon control. At step 1232, the method parses the identifier and stores its numeric value in the "ID_Value" field of the table.

At step 1233, the method determines the coordinates (dimension) for the resource and stores them in the table. At step 1234, any control styles (e.g., WS_VISIBLE) are stored in the table. Finally at step 1235, any comments (embedded by the programmer) associated with the resource are stored in the translation table. As sources are typically continually upgraded, it is desirable to provide this facility to allow the original developer (i.e., the one who knows the message and its context the best) to document the original message with comments in the source code. The extractions tools, in turn, store these comments in the database. After step 1235, the method returns.

In an exemplary embodiment, a Control Fill Fields method may be constructed, as follows (shown in annotated C++ listings):

```
// Control fillfields
void Control::FillFields( )
{
    // Change to preprocessor state
    char ExpandMacros = PreprocessedFlux::ExpandMacros;
    PreprocessedFlux::ExpandMacros=0;
    // Type == Control
    strcpy( Fields->Type, "C");
    // Special processing is needed for icons
    // and generic "CONTROL" styles
    int isIcon = 0;
    int IsControl = !strcmpi(GetFlux( )->GetCurrentWord( ),
        "CONTROL");
    // Depending on CONTROL, EDITEXT etc. . fill the class field
    strcpy(Fields->Class,GetClass(GetFlux( )->GetCurrentWord( )));
    // bounds the father record number
    Fields->Father=GetFatherRecordNumber( );
    // it's translatable by default
    strcpy( Fields->Translatable, "Y");
    // for everything but listbox, scrollbar and editext there is
    // a string to grab
    if (strcmpi(GetFlux( )->GetCurrentWord( ),"LISTBOX") &&
        strcmpi(GetFlux( )->currentWord( ),"SCROLLBAR") &&
        strcmpi(GetFlux( )->currentWord( ),"COMBOBOX") &&
        strcmpi(GetFlux( )->currentWord( ),"EDITTEXT") )
    {
        PreprocessedFlux::DefineActivated=0;
        // ICON has a (usually blank) string
        if (!strcmpi (GetFlux( )->GetCurremtWord( ), "ICON"))
        // for an icon we want a blank string entry.
        {
```

-continued

```
        isIcon = 1;
        // Icon is not translatable
        strcpy( Fields->Translatable, "N");
        GetFlux( ) -> GetNextWord( );
    }
    else
    {
        getFlux( )->GetNextWord( );
        // can have a , after the class name!
        while (*GetFlux( )->GetCurrentWord( ) == ',')
        {
            GetFlux( )->GetNextWord( );
        }
        //Store translatable string into fields
        strncpy(Fields->String, GetFlux( )->GetCurrentWord( ),
            sizeof(Fields->String));
        while (*GetFlux( ) -> GetNextWord( ) == '"')
        {
            Fields->String[strlen(Fields->String) - 1] = 0;
            strcat(Fields->String, GetFlux( ) ->
                GetCurrentWord( ) + 1);
        }
    }
    if (*GetFlux( ) -> GetCurrentWord( ) == ',')
    {
        while (*GetFlux( ) -> GetNextWord( ) == ',');
    }
}
else
{
    PreprocessedFlux::DefineActivated=0;
    while (*GetFlux( ) -> GetNextWord( ) == ',')
        ;
}
// All end up at the indentifier field
strcpy ( Fields->Identifier, GetFlux( )->GetCurrentWord( ));
while (strchr("+-*", *GetFlux( )->GetNextWord( )))
{ // Identifiers can be seperated by operators
    strcat( Fields->Identifier,GetFlux( )->GetCurrentWord( ));
    strcat( Fields->Identifier,GetFlux( )->GetNextWord( ));
}
if (isIcon)
{
    GetFlux( )->GetNextWord( );
    while (*GetFlux( ) -> GetNextWord( ) == ',')
        ;
}
if (ParseIDs)
    Fields->ID_Value = parseString(Fields->Identifier);
PreprocessedFlux::DefineActivated=1;
if ( (WindowRC) && (IsControl) )
// Similar logic for generic "CONTROL" style
{
    //...
}
if (*GetFlux( )->GetCurrentWord( )==',') GetFlux( )->
    GetNextWord( );
PreprocessedFlux::DefineActivated=0;
// Now read dimensions into coordinates field
((Dialog*) Father)->GetCoordinate(Fields->Dimension);
if (*GetFlux( )->GetNextWord( )==',') GetFlux( )->
    GetNextWord( );
strcat( Fields->Dimension, ","); // ,
((Dialog*) Father)->GetCoordinate(Fields->Dimension);
if (*GetFlux( )->GetNextWord( )==',') GetFlux( )->
    GetNextWord( );
strcat( Fields->Dimension,","); // ,
((Dialog*) Father)->GetCoordinate(Fields->Dimension);
if (*GetFlux( )->GetNextWord( )==',') GetFlux( )->
    GetNextWord( );
strcat( Fields->Dimension, ","); // ,
((Dialog*) Father)->GetCoordinate(Fields->Dimension);
// Parse control styles
// Fill the Style Text Global
( (Dialog*) Father ) -> GotoNextControl( );
if ( (WindowRC) && (!IsControl) )   // Variable.
        ControlStyle |= GlobalStyle;
Fields->Style = ControlStyle;
// look for comments
char *comment = GetFlux( ) -> GetComment( );
```

-continued

```
if (comment)
{
    strncpy( Fields->Comment, comment, (sizeof(Fields->
        Comment)-1));
}
PreprocessedFlux::ExpandMacros=ExpandMacros;
```

5. Update file method

FIG. 12D illustrates an Update File (UpdateFile) method 1240 of the present invention which is responsible for writing the contents of the Fields (which are stored in memory as a record buffer at this point) into the Translation Table, which resides on a persistent storage device (e.g., hard disk). In general, the routine proceeds by adding a new record for the item if one does not already exist, or modifying the record if one already exists for the item. The method is also responsible for exporting translated strings into new resources, when the EXPIMP module is exporting.

Figure 12E:
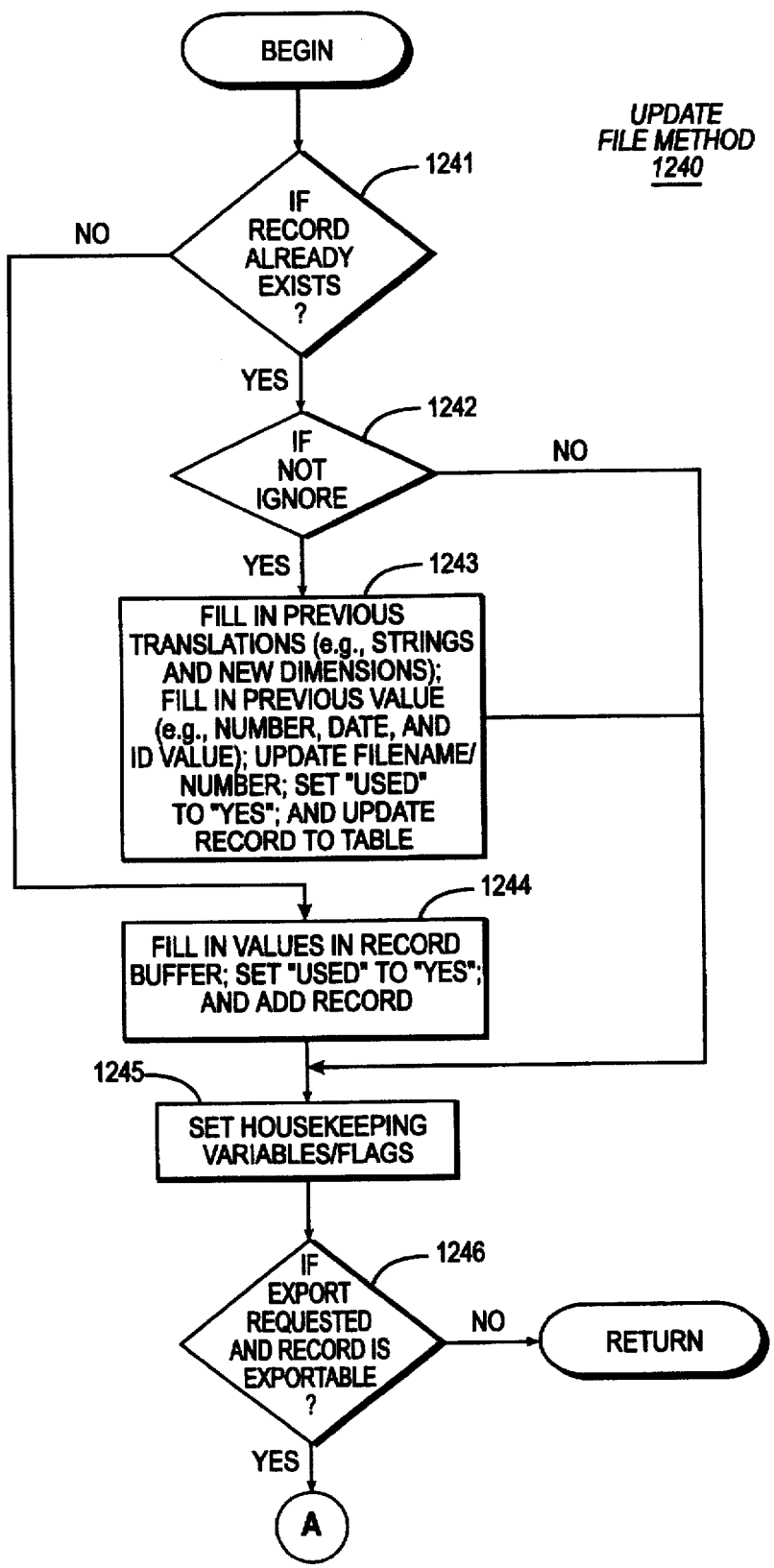
FIG. 12E is a flowchart illustrating an "Update File" method of the present invention.
Figure 12E:
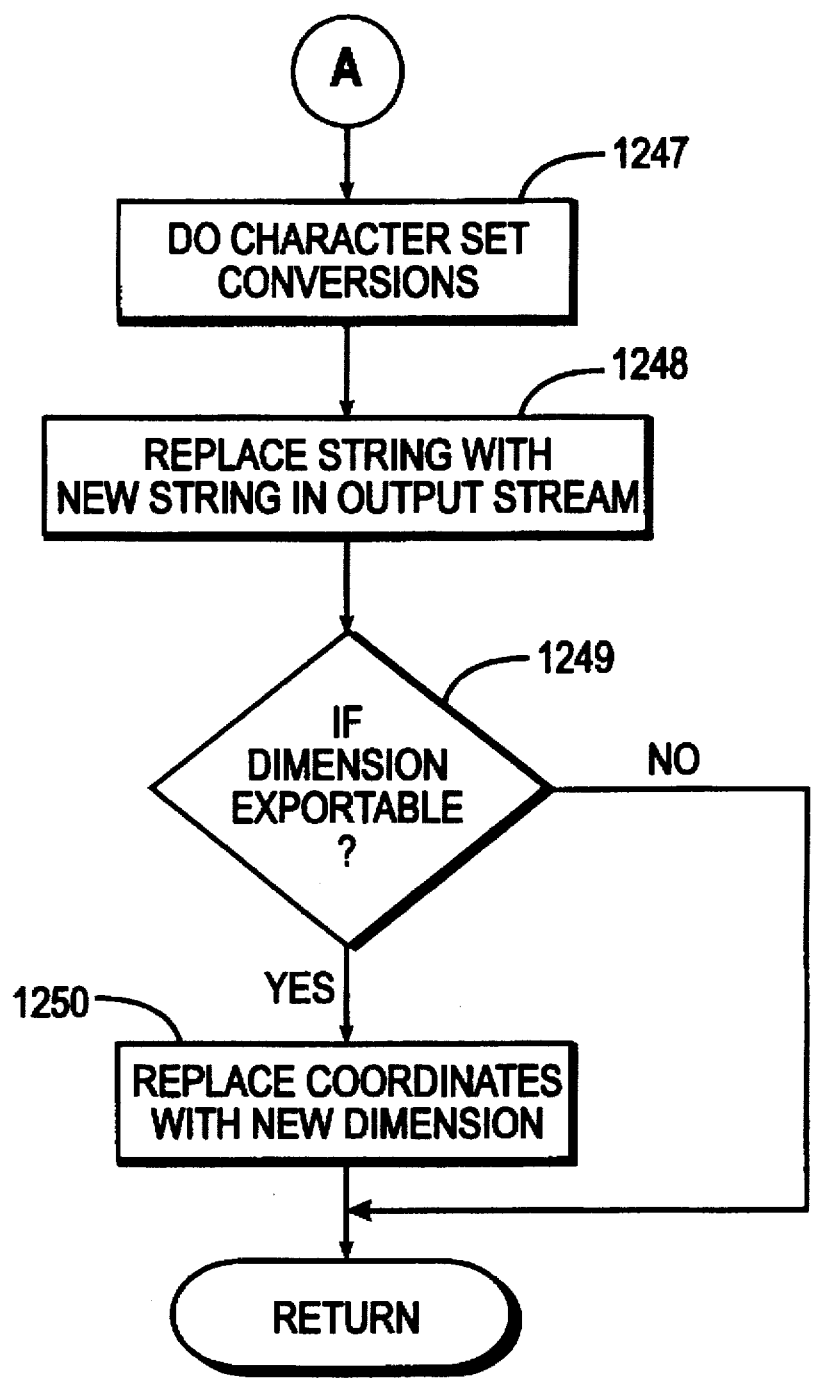

Referring now to FIG. 12E, the steps of the UpdateFile method 1240 are as follows. At step 1241, the method determines if a record for this item already exists. If yes at step 1241, the method proceeds to step 1242 to determine whether the record has been marked as "I"gnore (e.g., by the end-user translator). If the record is not to be ignored, then at step 1243 the record is updated. This is done by filling in the previous translations (if any) and previous values. The Filename/Line Number is updated and the "Used" field is set to "Y"es. Finally, the updated record buffer is then posted back to the table.

If at step 1241, a record does not already exist, the method will then proceed to add a new record as follows. At step 1244, the method fills in values in the record buffer, in a manner similar to that described for step 1243. This record buffer is then written to the table as a new record. At step 1245, internal housekeeping variables (e.g., NumberAdded) are set (e.g., incremented), as needed. Note that the test for "I"gnore at step 1242 only applies if a record already exists—one cannot "ignore" a record which has not even been posted yet. Therefore, a "No" at step 1242 causes the method to proceed to step 1244 for posting a new record.

The remaining steps of the update file method 1240 handle the exporting of resources to a translated resource file. As noted above, while the Translation Table is being updated with new information, it is convenient to also write that information out to an output stream. At step 1246, if export is requested and the string is one which may be exported, then the method proceeds to step 1247. Otherwise (no at the step), no exporting is required and the method may return. In a preferred embodiment, the test for determining whether an item may be exported includes testing whether there exists original and new strings, whether the item is "translatable", and whether the item is "used". If these conditions hold, then the method proceeds to step 1247 to do character set conversions for the string to export. At step 1248, the method replaces the string in the buffer (output stream) with the new string. At step 1249, the method makes the determination whether the dimensions are to be exported. Exportable dimensions occur when there exists original and new dimensions and the item is either "translatable" or a number. If these conditions hold, then the method proceeds to step 1250 to replace the original coordinates with those specified by the new dimension. At the conclusion of step 1250, the method returns.

In an exemplary embodiment, an Update File method may be constructed, as follows (shown in annotated C++ listings):

```
// Update file
// Routine to find the record if it already exists,
// add a new record if new.
// Also responsible for replacing translated strings if we are exporting
void Item2Table::UpdateFile( )
{
    ItemRecord R;
    RECORDNUMBER RecordNumber;
    //. . .
    {
        char fName[80];
        if ((RecordNumber=GetTable( )->Exist(Fields))!=0)
        {
            // record already exists
            GetTable( )->GetRecord(RecordNumber,&R);
            if (R.Used[0]!='T') // I == 'ignore'
            {
                // Fill in previous translations
                strcpy( Fields->NewDimension,R.NewDimension);
                if (strlen(R.NewString))
                {
                    strcpy( Fields->NewString,R.NewString);
                    NumberTranslated++;
                }
                // Fill in previous values
                Fields->Number=R.Number;
                Fields->Date=R.Date;
                R.ID_Value = Fields->ID_Value;
                // Update file name/line number
                sprintf(fName, "%s %5d", GetFlux( )->
                        GetFileName( ),
                        GetFlux( ) -> GetLineNumber( ));
                strncpy(Fields->FileName,fName,sizeof(Fields->
                        FileName)-1);
                // Set used field
                strcpy(Fields->Used, "Y");
                // . . and update table
                GetTable( )->UpdateRecord(RecordNumber,Fields);
            }
        }
        else
        {
            // New record
            //. . .
            // Fill in values
            sprintf(fName, "%s %5d", GetFlux( )->GetFileName( ),
                    GetFlux( ) -> GetLineNumber( ));
            strncpy(Fields->FileName,fName,sizeof(Fields->
                    FileName)-1);
            /* Patch to Import and Convert ansto850(Fields->String); */
            strcpy(Fields->Used, "Y");
            // Update table
            RecordNumber=GetTable( )->AddRecord(Fields);
            // Keep track of housekeeping statistics
            NumberAdded++;
        }
        // More housekeeping
        if (Fields->Used[0] == 'Y' && *Fields->Translatable==
        'Y' &&
            strlen(Fields -> String) > 2)
        {
            NumberTranslatable++;
        }
    }
    // Everything after here applies only to exporting
    // Export strings
    if ( (GetFlux( )->Export( )) && (Fields->NewString[0])
            && (Fields->String[0])
            && (*Fields->Translatable=='Y') && (*Fields->Used==
            'Y'))
    {
        // Do any necessary character set conversions
        if (ANSIOEMConversion)
        {
            oemtoans(Fields->NewString);
        }
        if (JapaneseConversion)
        {
            JapanConvert(Fields->NewString);
        }
        if (TaiwanConversion)
        {
            TaiwanConvert(Fields->NewString);
        }
        // Replace the string in the buffer
        if (!((ExportFlux*)GetFlux( ))->Replace(Field->String,
                Fields->NewString))
        {
            GetFlux( )->FluxError("Cannot replace string in",
                    Fields->Identifier);
        }
    }
    //Export dimensions
    if ((GetFlux( )->Export( )) && (Fields->Dimension[0])
            && (Fields->NewDimension[0])
            && ((*Fields->Translatable=='Y') || (*Fields->Type == 'N'))
            && (*Fields->Type != 'O') && (*Fields->Type != 'D')
            && (*Fields->Type != 'S'))
    {
        if (! ((ExportFlux*)GetFlux( ))->ReplaceCoords(
                Fields->Dimension,Fields->NewDimension,
                Fields -> Identifier ))
        {
            GetFlux( )->FluxError("Cannot replace dimension in",
                    Fields->Identifier);
        }
    }
    //. . .
}
```

6. Create Childs method

Figure 12F:
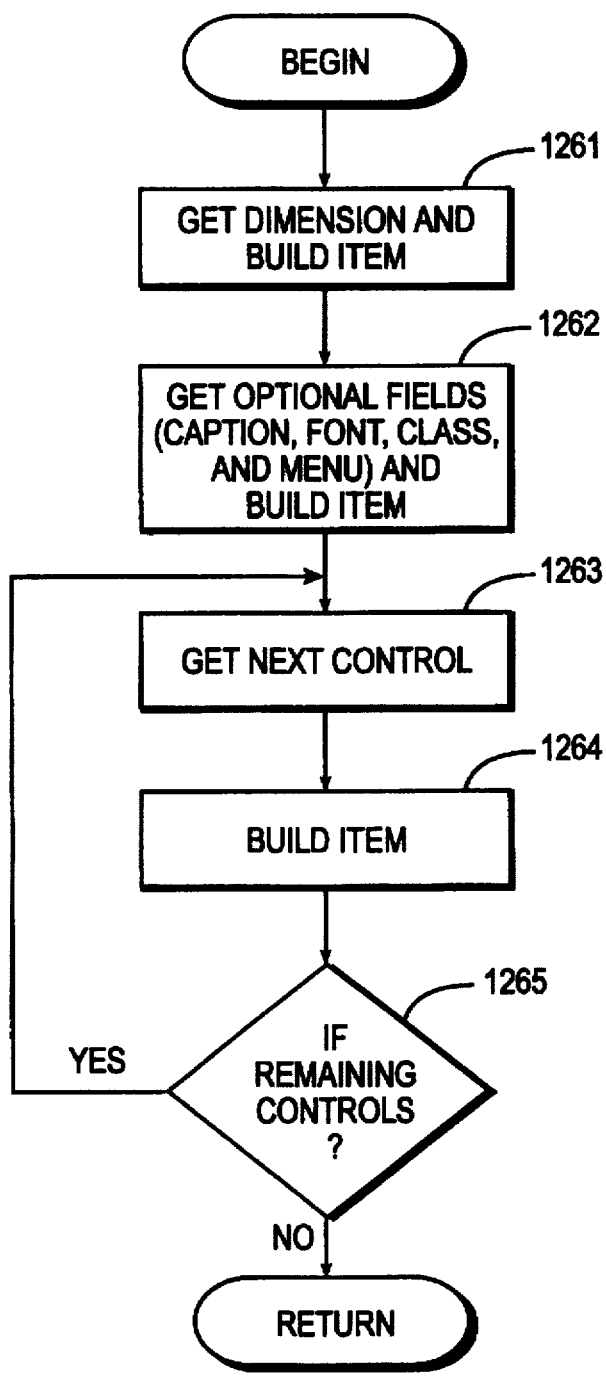
FIG. 12F is a flowchart illustrating a "CreateChilds" method of the present invention, for use with dialog objects.

Referring now to FIG. 12F, the Create Childs method 1260 for a dialog is illustrated. In general, the method operates by processing each control (i.e., building an "Item" for placement in the Translation Table) that may be contained within the dialog. At step 1261, the Dimension for the dialog is retrieved from the resource file and an "Item" is built for that Dimension. In other words, even though Dimension is not a child control per se, in a preferred embodiment it is treated as such. At step 1262, optional dialog fields (e.g., Caption, Font, Class, and Menu) are retrieved from the resource file and used to build corresponding Items. Thus, these optional fields are also treated as children, although they are not child controls per se.

Steps 1263–1265 process the "true" controls of the dialog. In particular, at step 1263, the next control is retrieved from the resource file, and at step 1264 an "Item" object is built with that control. At the end of step 1264, the control has been registered with the Translation Table and the in-memory "Item" object is destroyed. At step 1265, if further controls remain for the dialog, the method loops back to step 1263 to continue processing. Otherwise ("No" at step 1265), the method has completed and may return.

In an exemplary embodiment, a Create Childs method may be constructed, as follows (shown in annotated C++ listings):

```
// CreateChilds
void Dialog::CreateChilds( )
{
    //. . .
    // All optional parts of the dialog (STYLE, CAPTION, etc.
    // are stored as children of the dialog)
    {
        // There is always a dimension and it should be next from
        // the preprocessor
        Item *I = (Item *) new DialogDimension(this);
```

```
        I→Build( );
        delete I;
    // Look for begin and parse optional fields
    while ((strcmpi(GetFlux( )→GetCurrentWord( ),"BEGIN"))
        && (*GetFlux( )→GetCurrentWord( ) != '{')
        && (strcmpi(GetFlux( )→GetNextWord( ),"BEGIN"))
        && (*GetFlux( )→GetCurrentWord( ) != '{'))
    {
        if (!strcmpi(GetFlex( )→GetCurrentWord( ),"STYLE"))
        {
            GetFlux( )→GetNextWord( );
            char style[1024];
            // GetNextToken returns a compound statement
            GetFlux( ) → GetNextToken(style);
            // Style is stored as a numeric value,
            // so evaluate the text string
            Fields → Style = parseString(style);
        }
        // NB GetNextToken leaves the currentword after the
        // end of the style.
        // so GetCurrentWord is the one we are interested in
        if (!strcmpi(GetFlux( )→GetCurrentWord( ),"CAPTION"))
        {
            Item *I = (Item *) new Caption(this);
            I→Build( );
            delete I;
        }
        else
        if (!strcmpi(GetFlux( )→GetCurrentWord( ),"FONT"))
        {
            Item *I = (Item *) new Font(this);
            I→Build( );
            delete I;
        }
        else
        if (!strcmpi(GetFlux( )→GetCurrentWord( ),"CLASS"))
        {
            Item *I = (Item *) new DialogClass(this);
            I→Build( );
            delete I;
        }
        else
        if (!strcmpi(GetFlux( )→GetCurrentWord( ),"MENU"))
        {
            Item *I = (Item *) new DialogMenu(this);
            I→Build( );
            delete I;
        }
    }
}
//...
// tell the preprocessor to evaluate defines
PreprocessedFlux::DefineActivated=1;
// Reads stream until next CONTROL, EDITTEXT, etc
GotoNextControl( );  // should be on CONTROL etc... or END
while (strcmpi(GetFlux( )→GetCurrentWord( ),"END") &&
    (*GetFlux( )→GetCurrentWord( )!='}') &&
    !(GetFlux( )→eof( )))
{
    if (!strcmpi(GetFlux( )→GetCurrentWord( ),"CTLDATA"))
    {
        if (!strcmpi(GetFlux( )→GetNextWord( ),"BEGIN")
            || *GetFlux( )→GetCurrentWord( ) == '{')
        {
            GetFlux( ) → GotoNext("END","}");
        }
        else
        if (*GetFlux( )→GetCurrentWord( ) != '\"')
        {
            GetFlux( ) → FluxError("Unrecognized CTLDATA
                    format",
                    GetFlux( )→GetCurrentWord( ));
        }
        GetFlux( )→GetNextWord( );
    }
    else
    {
        // Create child control item
        Item *I = (Item *) new Control(this);
        I→Build( );
        delete I;
    }
}
PreprocessedFlux::DefinedActivated=0;
// Check for the closing END
if (GetFlux( )→eof( ))
    GetFlux( )→FluxError("END or } expected in Dialog",
                Fields→Identifier);
}
```

D. Extensibility

As translatable data comes from different types of "source files," different parsing engines can be employed to address the different needs of the various sources. For instance, a parser written to extract translatable strings from a C/C++ source file might be different from one written to extract data from ASM files or Windows resource (.RC) style files. Despite the fact that data are extracted from different types and formats of files, the Translation Table can store all translatable items. Thus, it is a container which serves as a lowest common denominator for storing translatable items from a variety of sources.

The parsing engines include the ability to upgrade information. As a new version of a source file is parsed, information which has been previously translated (i.e., from a prior version) is preserved. New items are related to items that they supersede, especially in instances where the new item contains a translation which may apply to the new item.

The parsing engine also includes the ability to construct "hybrid builds." During the translation of a "live" product (i.e., a product still under development), the UI continues to be in a state of flux, with translations of new strings not readily available. Nevertheless, there continues to be a need to have access to the product. In such instances, the parsing engine can build a product which is a hybrid. The hybrid consists of a build which employs existing translations in the localized language together with English or machine-generated pseudo language for any new items which have yet to be translated.

Advantages

By maintaining resource information in a platform-independent Translation Table, the system of the present invention provides a set of tools which may be employed across a variety of platforms for translating programs. The extraction or parsing tools are highly generic, so that new objects may be readily accommodated. Likewise, the editors are highly generic, thus allowing them to be used across diverse platforms and modules. For instance, a menu or dialog box editor employed for Microsoft Windows should also be capable of handling OS/2 style menus and dialog boxes. As long as resource information can be parsed and read into the Translation Table 340, the various tools of the system may be used in a platform-independent fashion.

Upon the user inputting a new text string in an editor, the translated resource on-screen illustrates the result. In this fashion, the end user translator can perform a translation on a "live" interface and is thus able to immediately see the results as he or she performs the translation. This approach of the present invention allows developers to see the results of translating as the translation is being done, instead of having to first rebuild the product with translated sources.

While the invention is described in some detail with specific reference to a single preferred embodiment and certain alternatives, there is no intent to limit the invention to that particular embodiment or those specific alternatives. For example, the foregoing description of the Item base class and derived classes (e.g., Dialog and Control) has focused on the Microsoft Windows environment; those skilled in the art will appreciate, however, that the system may be adapted for other platforms, including, for example, OS/2, NeXTStep, X-Windows, and the like. Moreover, since the Item class employs pure virtual methods, the adaptation is fairly straightforward. Thus, the true scope of the present invention is not limited to any one of the foregoing exemplary embodiments but is instead defined by the appended claims.

What is claimed is:

1. In a computer system, a method for assisting a user with translating a software program into a translated version which is localized for a particular locale, the software program having a plurality of resources for displaying a user interface, the method comprising:

(a) extracting translatable items of said resources from the software program, said translatable items including locale-dependent text strings which are displayed by said user interface and dimensions of said resources;

(b) storing said extracted translatable items in a translation table, said translation table for assisting with translating a locale dependent text string of a particular extracted translatable item to a new text string for the particular locale and inputting a new dimension of a resource of said particular extracted translatable item; and (c) translating said software program by translating at least one of the text strings of said extracted translatable items to a new text string for the particular locale, while at the same time indicating to the user how said new text string will appear in the user interface of the translated version so that said new dimension may be entered by the user.

2. The method of claim 1, wherein said translation table stores said extracted translatable items in a format which is independent of how resources are stored in the software program.

3. The method of claim 1, wherein step (a) includes:
   assigning a unique identifier to each translatable item extracted.

4. The method of claim 3, wherein said unique identifier remains static throughout the life of said software programs.

5. The method of claim 1, wherein said resources include dialogs and menus displayed by said interface.

6. The method of claim 5, wherein said translated items include text strings displayed by said dialogs and menus.

7. The method of claim 6, wherein said translatable items further include dimensions for resources of said text strings displayed by said dialogs and menus.

8. The method of claim 1, wherein step (a) includes:
   parsing resource information from a source file of the software program.

9. The method of claim 1, wherein step (a) includes decompiling resource information from a binary copy of the software program.

10. The method of claim 1, wherein said locale dependent text strings are in English prior to translation.

11. The method of claim 1, wherein said software program is a Microsoft Windows-compatible software program, and wherein said resources comprise Microsoft Windows application resources.

12. The method of claim 1, wherein step (b) includes:
    storing a string value and a dimension for each of the resources which is displayed as text by said user interface.

13. The method of claim 1, wherein said resources include a first resource which is displayed within a second resource, said second resource being a "father" resource and said first resource being a "child" resource.

14. The method of claim 13, wherein said translation table stores for each "child" resource extracted an identifier for referencing a corresponding "father" resource.

15. The method of claim 13, wherein said "father" resource is a dialog resource and wherein said "child" resource is a text string resource displayed within the dialog resource.

16. The method of claim 15, wherein said "father" resource, which is a dialog resource, is itself not displayed within another resource, and wherein said translation table stores a NULL value as the "father" identifier for the dialog resource.

17. The method of claim 1, wherein said new text string is translated into a non-English language.

18. The method of claim 1, wherein step (c) includes:
    displaying a string editor having a string field storing text strings of the software program and having a new string field for storing translated strings entered by the user.

19. The method of claim 18, wherein step (c) further includes:
    displaying a dialog editor showing a dialog resource of the software program and also showing a translated version of said dialog resource, said translated version being updated to show translated strings as they are entered by the user.

20. The method of claim 18, wherein step (c) further includes:
    displaying in the string editor a dimension field storing coordinates of resources of the software product and also displaying a new dimension field storing new coordinates of resources having text strings which have been translated by the user.

21. A computer system for assisting a user with translating a software program from one natural language to another, the system comprising:

a computer system having a screen display, said screen display for displaying a user interface of the software program;

a parsing engine for extracting translatable items including text strings and dimensions of resources from the user interface of the software program and storing those items in a database, said database storing text strings for at least two natural languages; and editors, operably coupled to the database, for translating text strings from one natural language to another while simultaneously showing the user how the translated text strings will appear in the user interface of a translated version of the software program utilizing dimensions stored in said database, and allowing a user to change dimensions of resources of the user interface of the software program to accommodate the translated text strings.

22. The system of claim 21, wherein said translatable items include text strings of the user interface and dimensions of resources including those text strings.

23. The system of claim 21, wherein said parsing engine includes:
    means for extracting resource information from the software program and determining translatable items present in said extracted resource information.

24. The system of claim 21, further comprising:
    exporting means for replacing translatable items of the software program which have been translated by the user with translated versions of those items.

25. The method of claim 21, wherein said database maintains a format which is independent of how resources are stored in the software program.

26. The system of claim 21, wherein said database includes fields for storing text strings and dimensions of resources as translatable items and also includes fields for storing new text strings and new dimensions for translatable items which have been translated by the user.

27. The system of claim 21, wherein said editors include selected ones of a string editor, a menu editor, and a dialog editor.

28. The system of claim 21, wherein said resources include dialog boxes, menus and controls displayed on said display screen.

29. The system of claim 21, wherein each dimension describes a size and position of a resource on said screen display, and wherein said parsing means stores with each translatable item its dimension.

30. In a computer system, an improved method for translating a computer program from one natural language to another, the improvement comprising:

(a) parsing user interface resources of the computer program into a central data container;

(b) storing with each resource its dimension as it appears on a user interface of the computer program; and (c) displaying at least one editor for translating text strings of said user interface resources, said at least one editor illustrating how each user interface resource which is translated will appear in the user interface of the computer program, including allowing a user to adjust the dimension of selected user interface resources which are translated.

31. The method of claim 30, wherein step (a) includes:

assigning each user interface resource a static ID for uniquely identifying the resource throughout different versions of the computer program.

32. The method of claim 30, wherein step (a) includes:

determining whether a first user interface resource is contained within a second user interface resource; and if a first user interface resource is determined to be contained within a second user interface resource, storing with the first user interface resource a parent ID for locating said second user interface resource.

33. The method of claim 30, wherein step (a) includes:

parsing programmers' comments present with said user interface resources and storing those comments in the central data container, for future use by an end-user translator.

34. The method of claim 30, wherein step (c) includes:

displaying a translator comment field for receiving a descriptive message from an end-user translator, so that descriptive messages can be stored with each user interface resource which is translated.

35. The method of claim 30, further comprising:

exporting said translated text strings out to a translated resource file; and creating a translated version of the computer program by re-building the computer program with said translated resource file.

36. In a computer system, a method of translating a software program into a translated version, said software program having a plurality of screen objects in a graphical user interface, the method comprising the steps of:

extracting text strings and dimensions associated with screen objects of said graphical user interface of said software program;

translating a selected screen object by entering a new text string for said selected object;

displaying said selected object with said new text string and said extracted dimensions;

inputting new dimensions for said displayed selected object to accommodate said new text string; and generating said translated version which includes said selected screen object with said new text string and said new dimensions.

37. The method of claim 36, further comprising the step of storing said text strings and dimensions in a translation table according to the screen object to which they are associated.

38. The method of claim 37, further comprising the step of storing a unique identifier in said translation table for each of said screen objects.

39. The method of claim 37, further comprising the step of storing values in said translation table indicating if a screen object is displayed within another screen object.

40. A computer program product that translates a software program into a translated version, said software program having a plurality of screen objects in a graphical user interface, the computer program product comprising:

computer code that extracts text strings and dimensions associated with screen objects of said graphical user interface of said software program;

computer code that translates a selected screen object by receiving input of a new text string for said selected object;

computer code that displays said selected object with said new text string and said extracted dimensions;

computer code that receives new dimensions for said displayed selected object as input from a user to accommodate said new text string;

computer code that generates said translated version which includes said selected screen object with said new text string and said new dimensions; and a computer readable medium that stores said computer codes.

41. The computer program product of claim 40, further comprising computer code that stores said text strings and dimensions in a translation table according to the screen object to which they are associated.

42. The computer program product of claim 41, further comprising computer code that stores a unique identifier in said translation table for each of said screen objects.

43. The computer program product of claim 41, further comprising computer code that stores values in said translation table indicating if a screen object is displayed within another screen object.

* * * * *